US010353989B1

United States Patent
Hjortshoj et al.

(10) Patent No.: US 10,353,989 B1
(45) Date of Patent: Jul. 16, 2019

(54) METHOD TO ALLOW SWITCHING OF USER INTERFACE LAYOUT BASED ON CONTEXT AND CONFIGURATION

(71) Applicant: Open Text Corporation, Waterloo (CA)

(72) Inventors: Julian M. Hjortshoj, San Francisco, CA (US); James E. Bostick, Salem, MA (US); Johan Bos, Vauvert (FR); Maxime Caignart, Montpellier (FR); Boris Carbonneill, Le Cres (FR)

(73) Assignee: OPEN TEXT CORPORATION, Waterloo (CA)

( * ) Notice: Subject to any disclaimer, the term of this patent is extended or adjusted under 35 U.S.C. 154(b) by 273 days.

(21) Appl. No.: 14/135,511

(22) Filed: Dec. 19, 2013

(51) Int. Cl.
*G06F 17/00* (2019.01)
*G06F 17/22* (2006.01)
*G06F 3/0484* (2013.01)

(52) U.S. Cl.
CPC ...... *G06F 17/2247* (2013.01); *G06F 3/04842* (2013.01)

(58) Field of Classification Search
CPC ........ G06F 3/0481; G06F 3/0484; G06F 8/20; G06F 8/38; G06F 17/2247
See application file for complete search history.

(56) References Cited

U.S. PATENT DOCUMENTS

| | | | | |
|---|---|---|---|---|
| 7,620,908 | B2 * | 11/2009 | Klevenz | G06F 9/451 715/781 |
| 2003/0023953 | A1 * | 1/2003 | Lucassen | G06F 8/38 717/106 |
| 2003/0095145 | A1 * | 5/2003 | Patrizio | G06F 3/0481 715/764 |
| 2004/0056900 | A1 * | 3/2004 | Blume | G06F 3/0481 715/807 |
| 2006/0048067 | A1 * | 3/2006 | Despain | G06F 3/0481 715/768 |
| 2008/0189679 | A1 * | 8/2008 | Rodriguez | G06F 8/34 717/105 |
| 2008/0307385 | A1 * | 12/2008 | Dreiling | G06F 8/34 717/108 |
| 2009/0013310 | A1 * | 1/2009 | Arner | G06F 8/38 717/120 |
| 2009/0094551 | A1 * | 4/2009 | Alkov | G06F 9/4443 715/802 |
| 2010/0223322 | A1 * | 9/2010 | Mott | G06F 17/30905 709/203 |
| 2011/0060994 | A1 * | 3/2011 | Maxwell | G06F 3/147 715/730 |

(Continued)

OTHER PUBLICATIONS

Window Features,msdn.com/en-us/library/windows/desktop/ms632599(v-vs.85).asp, 11 pages, Wayback Machine archive Aug. 7, 2013.*

(Continued)

*Primary Examiner* — Scott T Baderman
*Assistant Examiner* — Barbara M Level
(74) *Attorney, Agent, or Firm* — Sprinkle IP Law Group

(57) ABSTRACT

A web application workspace is received comprising a UI layout and a UI element. A focus communication is defined associated with the UI element, wherein when the focus communication is asserted at run time the UI element is made visibly more focused.

24 Claims, 21 Drawing Sheets

(56) References Cited

U.S. PATENT DOCUMENTS

| | | | | |
|---|---|---|---|---|
| 2011/0276908 A1* | 11/2011 | O'Riordan | ............ | G06F 9/4443 715/763 |
| 2012/0137268 A1* | 5/2012 | Dattke | ...................... | G06F 8/38 717/105 |
| 2012/0198373 A1* | 8/2012 | Kowalski | ............ | G06F 17/3053 715/767 |
| 2013/0167080 A1* | 6/2013 | Ari | ........................ | G06F 3/0481 715/801 |
| 2013/0332813 A1* | 12/2013 | Heinrich | ............ | G06F 17/2247 715/234 |
| 2014/0096158 A1* | 4/2014 | Chao | ..................... | G06F 3/0481 725/37 |
| 2014/0282217 A1* | 9/2014 | Musa | .................... | G06F 3/0481 715/781 |
| 2014/0282365 A1* | 9/2014 | Hsu | .......................... | G06F 8/20 717/105 |
| 2015/0019991 A1* | 1/2015 | Kristj Nsson | ......... | G06F 3/0484 715/747 |
| 2017/0103050 A9* | 4/2017 | Underwood | ......... | G06F 17/2247 |

OTHER PUBLICATIONS

Dave Springgay, Eclipse Corner Article, Using Perspectives in the Eclipse UI, Aug. 27, 2001.

* cited by examiner

FIG. 7

902 — Case 1: another view V1 contains a widget W1 such that both V1 and W1 have the current UI event set as focus event, and V1 and W1 have matching "additional event parameters":
Set view to V1 and focus to W1

904 — Case 2: the current view V0 contains a widget W1 such that W1 has the current event set as focus event
Set view to V0 and focus to W1

906 — Case 3: another view V1 contains a widget W1 such W1 has the current event set as focus event:
Set view to V1 and focus to W1

908 — Case 4: another view V1 has the current event set as focus event:
Set view to V1

Reconciling Focus Communication

FIG. 9

```xml
<?xml version='1.0' encoding='UTF-8'?>
<root xmlns:xsi="http://www.w3.org/2001/XMLSchema-instance" xsi:noNamespaceSchemaLocation="SpaceSchema.xsd">
  <space>
    <border-layout-container>
      <data>
        <border-layout-data layoutregion='WEST' split='true' size='260' minSize='150'/>
        <border-layout-data layoutregion='CENTER' split='true'/>
        <border-layout-data layoutregion='SOUTH' split='true'/>
        <border-layout-data layoutregion='EAST' split='true' size='300' minSize='150'/>
      </data>
      <content>
        <tab-container>
          <content>
            <widget config='repository browser' />
            <widget config='saved searches' />
            <widget config='task browser' hidden='true' />   1202
          </content>
        </tab-container>
        <tab-container>
          <content>
            <widget config='doclist' />
            <widget config='tasks' hidden='true' />
            <widget config='notifications' hidden='true' />   1204
          </content>
        </tab-container>
        <tab-container>
          <content>
```

FIG. 12

```
<widget config='locations' />
<widget config='versions' />
<widget config='renditions' />
<widget config='relations' />
<widget config='audit' />
<widget config='somewidget' hidden='true' />
<widget config='somewidget' hidden='true' />     ─ 1206
<widget config='somewidget' hidden='true' />
<widget config='somewidget' hidden='true' />
        </content>
    </tab-container>
</accordion-container>
<content>
<widget config='preview' />
<widget config='properties' />
<widget config='virtualdoc' hidden='true' />     ─ 1208
</content>
</accordion-container>
</content>
</border-layout-container>
</space>
</root>
```

FIG. 12 (Cont.)

METHOD TO ALLOW SWITCHING OF USER INTERFACE LAYOUT BASED ON CONTEXT AND CONFIGURATION

BACKGROUND OF THE INVENTION

Web applications may be used as clients for content management services and/or servers ("CMS"). In many web application clients, including Documentum clients sold by EMC Corporation, for example xCP, CenterStage, or WDK, it is a standard behavior to change layouts and visible user interface ("UI") elements in response to changes in selection, or other user actions.

For example, xCP based clients expose pages and page fragments bound to object types, and load those pages when an object of the corresponding type is selected. This provides an ability to display different user interfaces corresponding to different types of stored objects. Changes to the user interface, for example layout, workspace views, visible widgets, and widget focus, are controlled by being built into said client. Views that switch the UI layout in response to UI events may also be built into said client. There exists a need for flexibility in switching a user interface layout.

BRIEF DESCRIPTION OF THE DRAWINGS

Various embodiments of the invention are disclosed in the following detailed description and the accompanying drawings.

FIG. 7 is a sample screenshot of an embodiment of an event focus configuration at design-time.

FIG. 9 is a block diagram illustrating an embodiment of reconciling focus communication.

FIG. 12 is a sample XML layout.

DETAILED DESCRIPTION

Figure 1:
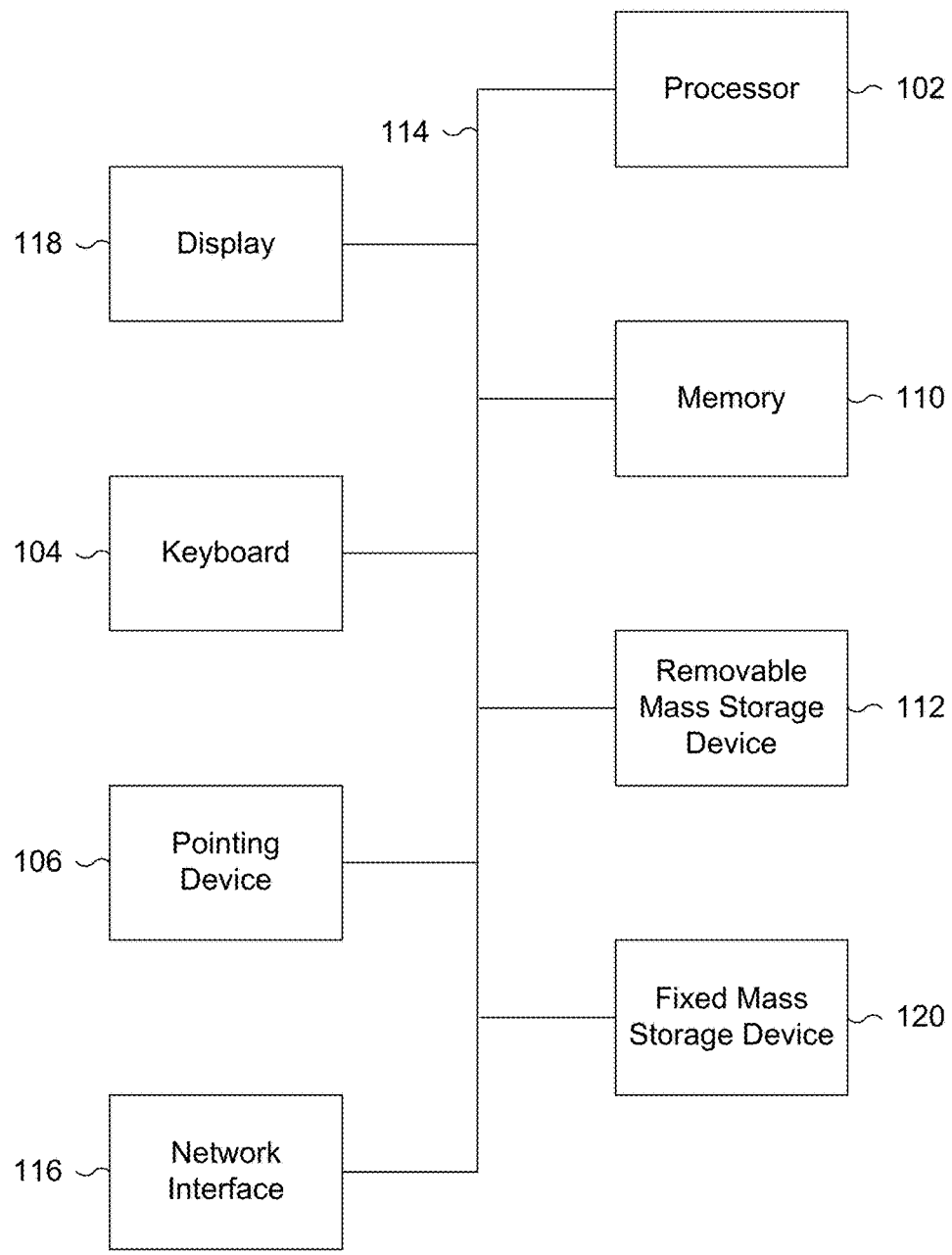
FIG. 1 is a functional diagram illustrating a programmed computer system for distributed workflows in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Dynamically changing the web application CMS client user interface, for example layout, workspace views, visible widgets, and widget focus, via control by configuration is disclosed. A configuration and/or privileged user, known throughout this specification as an "administrator", may define "focus events" that will cause a widget in the workspace to gain focus and come to the foreground when a specific UI event occurs.

Throughout this specification a "web application workspace" refers without loss of generality to a rendered UI layout as an arrangement of widgets, typically displaying content managed folders, files, and/or a rendering/preview of managed content. Throughout this specification a "widget" refers without loss of generality to any reusable component or element of a UI and/or workspace. Examples of a widget include: a browser widget and/or a repository navigation widget, a list widget, a thumbnail widget, a preview widget, a tasks browser widget, a virtual document widget. Other examples of widgets include: search widgets, content properties widgets, workflow widgets, and administration widgets.

Throughout this specification, without loss of generality a virtual document refers to a collection of multiple documents into an ordered, logical unit. Users can collaboratively author the components as individual objects, while a consistent set of governance and management policies can be applied to the entire collection, including lifecycles, workflow, versioning, security, and retention policies. For example, a user may manage an entire book as a single virtual document, with the chapters appearing as separate documents within the collection.

In one embodiment, each workspace is an XML file that specifies a (visual) layout, as well as all of the widgets that should appear in that layout. Traditionally, end users may choose different workspaces, and change the widgets appearing in the workspace, but they must do so manually. By contrast, within the disclosed changes to user interface (layout, visible widgets, and widget focus) are controlled by configuration, rather than being built into the client.

In one embodiment, the list of events that could be used to threshold the focus of one specific widget may sometimes be incomplete, with only the "shortcut" events being listed for some of them. As most of the manager behind use of one event that target it as a manager but with many parameters to handle its logic, a mapping may be made that allows the same action with only a specific single/unique event per case. In one embodiment, some menu entries are setup using the complex event with many parameters. A subsystem may not necessarily need to understand why its focus event setup has not been thresholded by the switch when the menu is being clicked and/or a UI event is asserted.

FIG. 1 is a functional diagram illustrating a programmed computer system for distributed workflows in accordance with some embodiments. As shown, FIG. 1 provides a functional diagram of a general purpose computer system programmed to execute workflows in accordance with some embodiments. As will be apparent, other computer system architectures and configurations can be used to execute workflows. Computer system 100, which includes various subsystems as described below, includes at least one microprocessor subsystem, also referred to as a processor or a central processing unit ("CPU") 102. For example, processor 102 can be implemented by a single-chip processor or by multiple cores and/or processors. In one embodiment, processor 102 is a general purpose digital processor that controls the operation of the computer system 100. Using instructions retrieved from memory 110, the processor 102 controls the reception and manipulation of input data, and the output and display of data on output devices, for example display 118.

Processor 102 is coupled bi-directionally with memory 110, which can include a first primary storage, typically a random-access memory ("RAM"), and a second primary storage area, typically a read-only memory ("ROM"). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as well known in the art, primary storage typically includes basic operating instructions, program code, data and objects used by the processor 102 to perform its functions, for example programmed instructions. For example, primary storage devices 110 can include any suitable computer-readable storage media, described below, depending on whether, for example, data access needs to be bi-directional or uni-directional. For example, processor 102 can also directly and very rapidly retrieve and store frequently needed data in a cache memory, not shown. The block processor 102 may also include a coprocessor (not shown) as a supplemental processing component to aid the processor and/or memory 110.

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storage 112, 120 generally store additional programming instructions, data, and the like that typically are not in active use by the processor 102. It will be appreciated that the information retained within mass storage 112, 120 can be incorporated, if needed, in standard fashion as part of primary storage 110, for example RAM, as virtual memory.

In addition to providing processor 102 access to storage subsystems, bus 114 can be used to provide access to other subsystems and devices as well. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information, for example data objects or program instructions, from another network, or output information to another network in the course of performing method/process steps. Information, often represented as a sequence of instructions to be executed on a processor, can be received from and outputted to another network. An interface card or similar device and appropriate software implemented by, for example executed/performed on, processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Throughout this specification "network" refers to any interconnection between computer components including the Internet, Ethernet, intranet, local-area network ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, WiFi, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous, heterogeneous systems and/or groups of systems together. Additional mass storage devices, not shown, can also be connected to processor 102 through network interface 116.

An auxiliary I/O device interface, not shown, can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example a script, that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Run-Time Use

Figure 2:
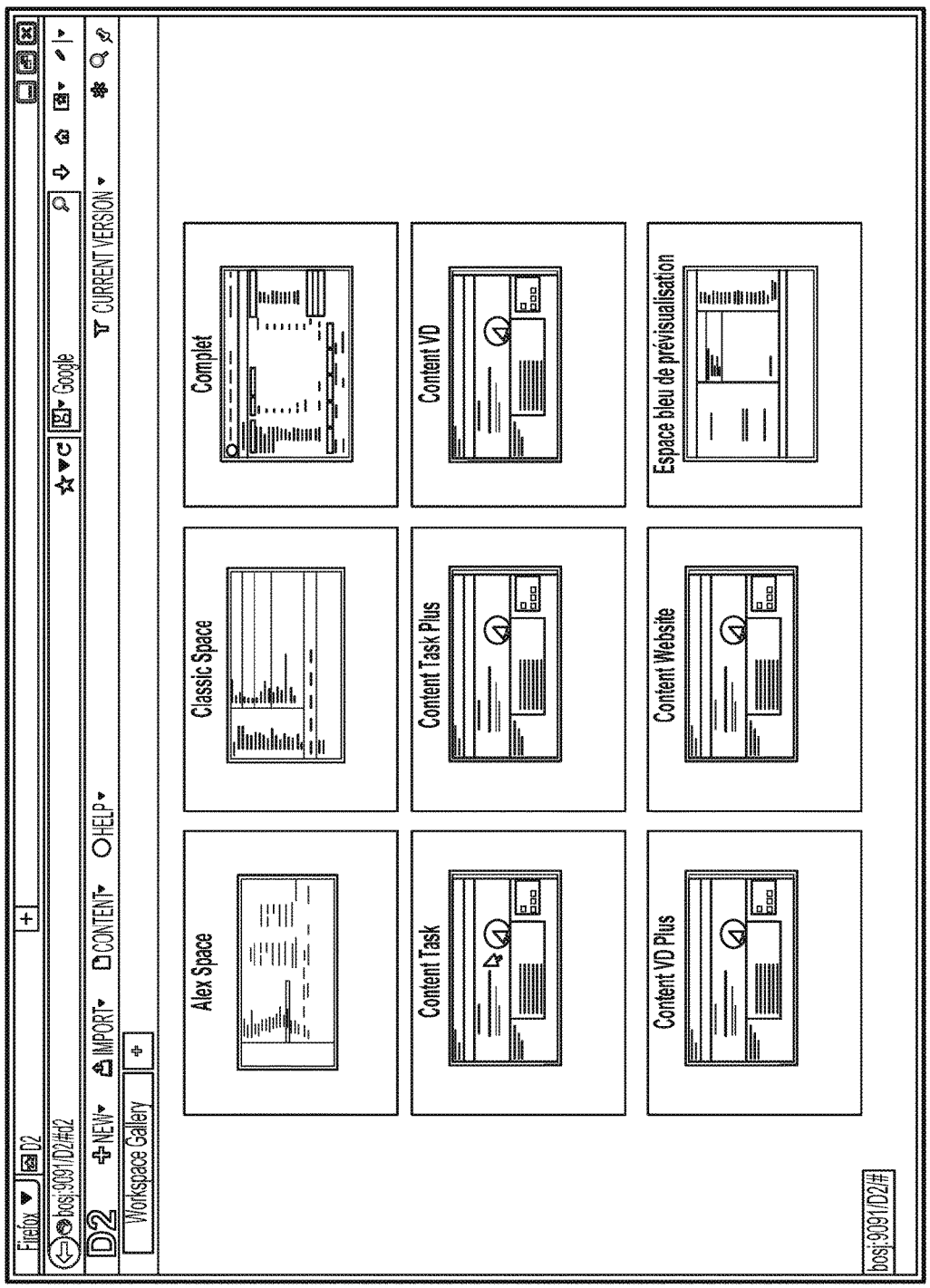
FIG. 2 is a sample screenshot of an embodiment of a workspace gallery.

FIG. 2 is a sample screenshot of an embodiment of a workspace gallery. A user with privileges may be able to access more than one CMS repository/project with different workspaces. The workspace gallery allows such a user to select a workspace to interface with.

Figure 3A:
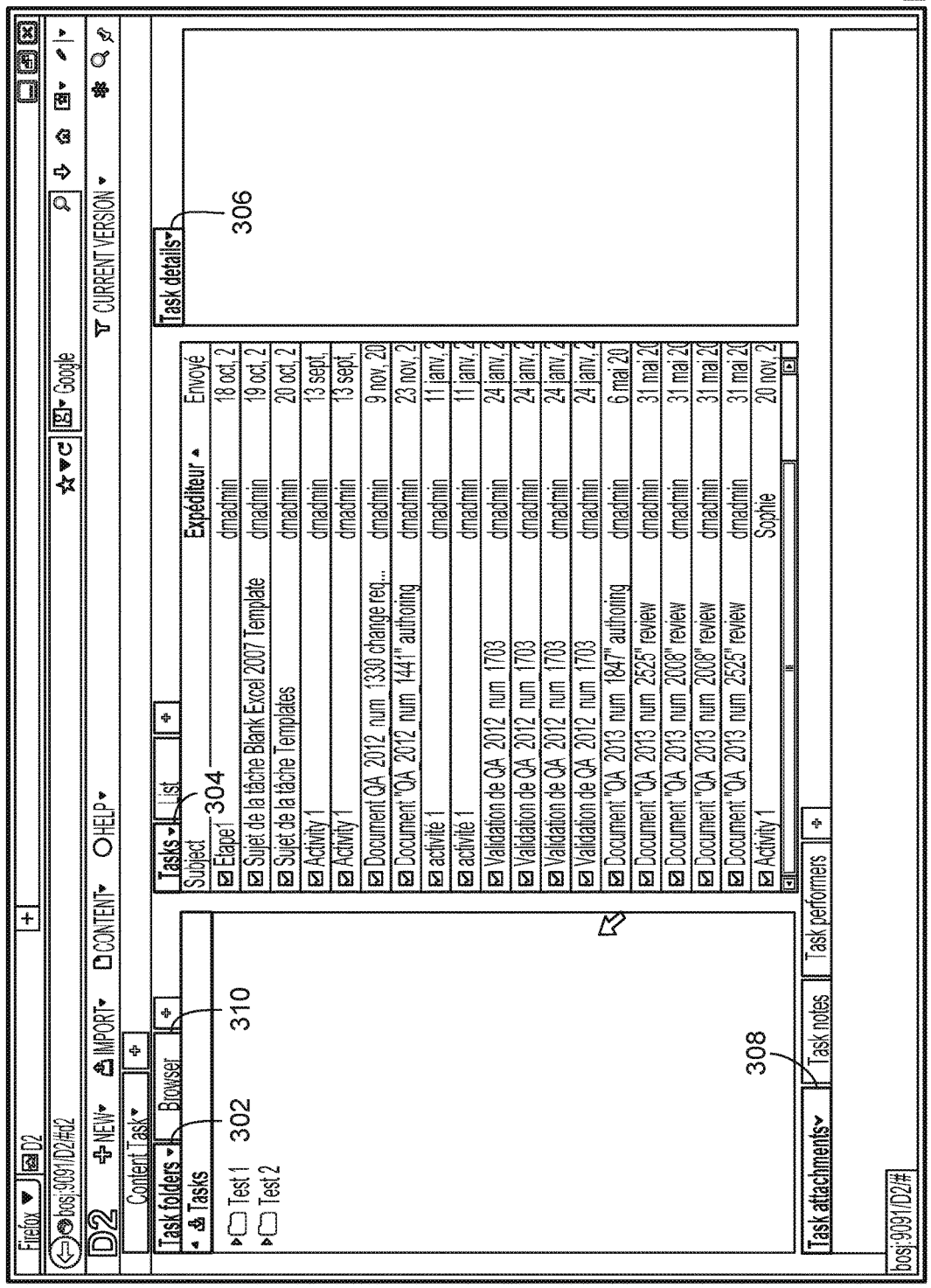
FIG. 3A is a sample screenshot of a set of task-related widgets in a traditional single view workspace.

FIG. 3A is a sample screenshot of a set of task-related widgets in a traditional single view workspace. The single view workspace shown in FIG. 3A would be what a user would view on the associated project, virtual document, and/or CMS repository. The single view workspace in FIG. 3A comprises three widgets: a tasks browser widget to display both a list of workflow/task folders 302 and a list of tasks sorted by category that have been assigned to the viewing user 304; a task details widget 306 to display a subject and message of a selected task if one were selected in 304; and a task attachment widget 308 to display a list of (managed) content attached to the selected task if one were selected in 304.

In one embodiment there may be a hidden widget such as that shown in FIG. 3A as a browser widget 310 which would generally display cabinets and folder associated with the single view workspace. In some cases, a widget is hidden because it is not immediately useful unless a context arises that requires it. In one embodiment asserting browser widget 310 by for example clicking on the tab associated with browser widget 310 would make the widget 310 more visible.

Figure 3B:
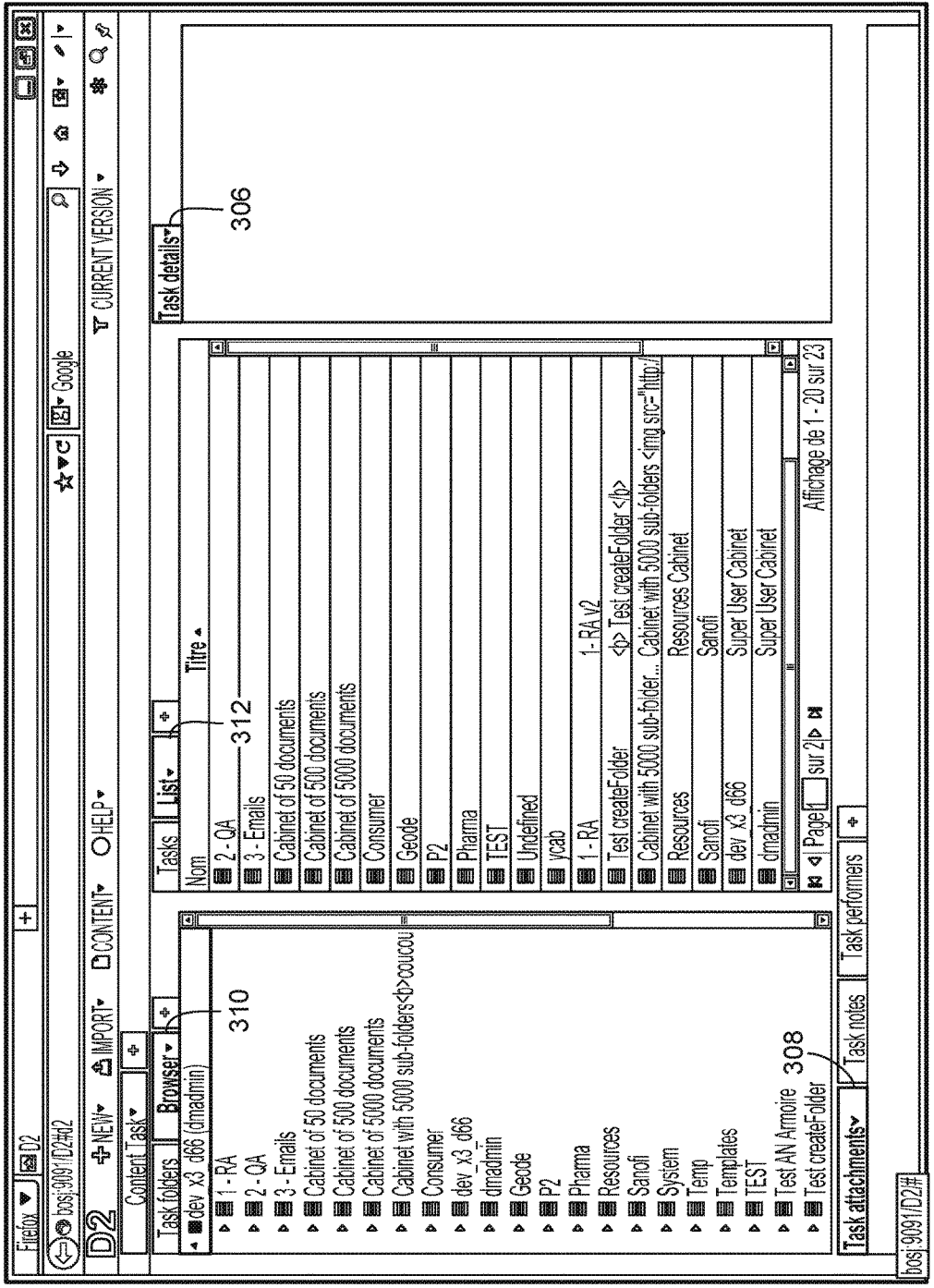
FIG. 3B is a sample screenshot of a set of browser-related widgets in a traditional single view workspace.

FIG. 3B is a sample screenshot of a set of browser-related widgets in a traditional single view workspace. The single view workspace shown in FIG. 3B would be what a user would view from the associated project, virtual document, and/or CMS repository from FIG. 3A, in some cases after click on the tab associated with browser widget 310. Selecting a cabinet in browser widget 310 unhides another widget, list widget 312. In one embodiment list widget 312 enables uncluttered browsing of a repository tree, for example by displaying content and virtual documents; enabling full browsing and content-seeking capabilities; allowing use of the widget to access the content context menu; and displaying results from quick search and predefined search widgets.

Note in FIG. 3A and FIG. 3B that the user interface is relatively static such that, for example, widgets 306 and 308 stay in the same part of the screen regardless of what's been selected in widget 302 or 310. There may be hidden widgets in a layout region, container and/or panel, but a single view workspace only contains the widgets (hidden and visible) set up by the administrator at run-time. By contrast, a multiview workspace dynamically changes the workspace view. Throughout this specification, in a workspace, layout regions are specified in the layout XML file as east, west, south, center, etc. The layout region XML defines the container type (e.g. tab group or accordion containers) and the widgets contained. The layout region does not require a container and can be configured to include only a single widget by the administrator. Example 306 is a "Layout region" that includes a widget without any container. This configuration of a layout region may not contain any hidden widgets.

Figure 4A:
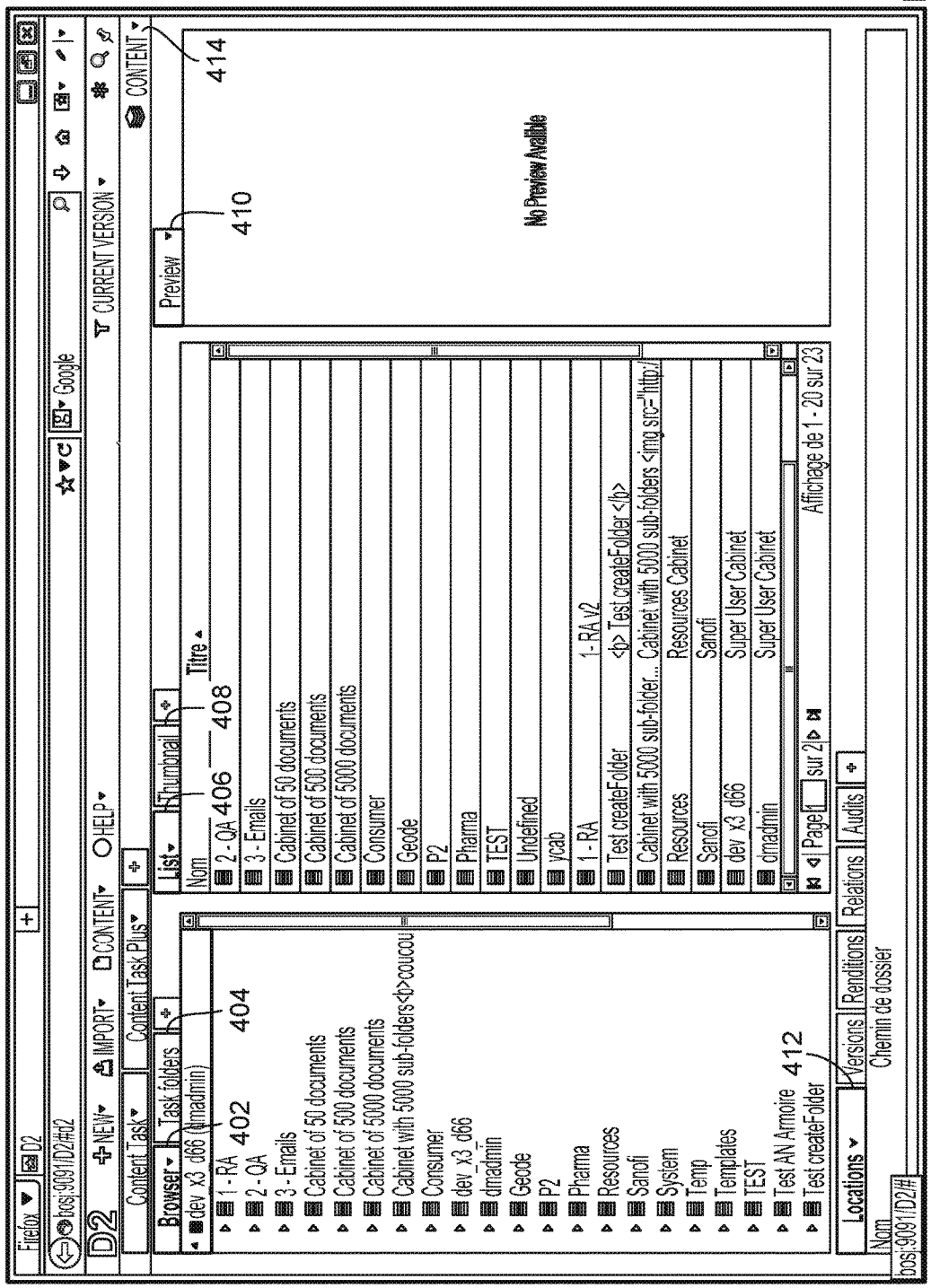
FIG. 4A is a sample screenshot of a content view in a multiview workspace embodiment.

FIG. 4A is a sample screenshot of a content view in a multiview workspace embodiment. The multiview workspace shown in FIG. 4A would be what a user would view from an associated project, virtual document, and/or CMS repository. Browser widget 402 and tasks folder widget 404 are similar to that shown in FIGS. 3A and 3B. In the example shown, by selecting a focus communication as explained below associated with widget 402 (for example, clicking on the tab associated with widget 402), a list widget 406 along with hidden thumbnail widget 408 is shown in the middle layout region. In one embodiment, a focus communication is termed a focus event. A preview widget 410 is shown in the right layout region, to display a selected content as a slide show. A locations widget 412 is shown in the bottom layout region, to display a list of directory locations in which the selected content is found. A more typical use case comprises where the repository browser widget with the doclist, thumbnails, properties, and preview widget are shown and selection of the task browser would display the hidden task list, task details, and task attachments.

In one embodiment, there may be a direct control 414 to display a view name and/or select various views in a multiview workspace. In one embodiment, this direct control is a menu control In one embodiment, this direct control is a button group. In the example in FIG. 4A, the direct control 414 is shown to be set to "content" for content view.

Figure 4B:
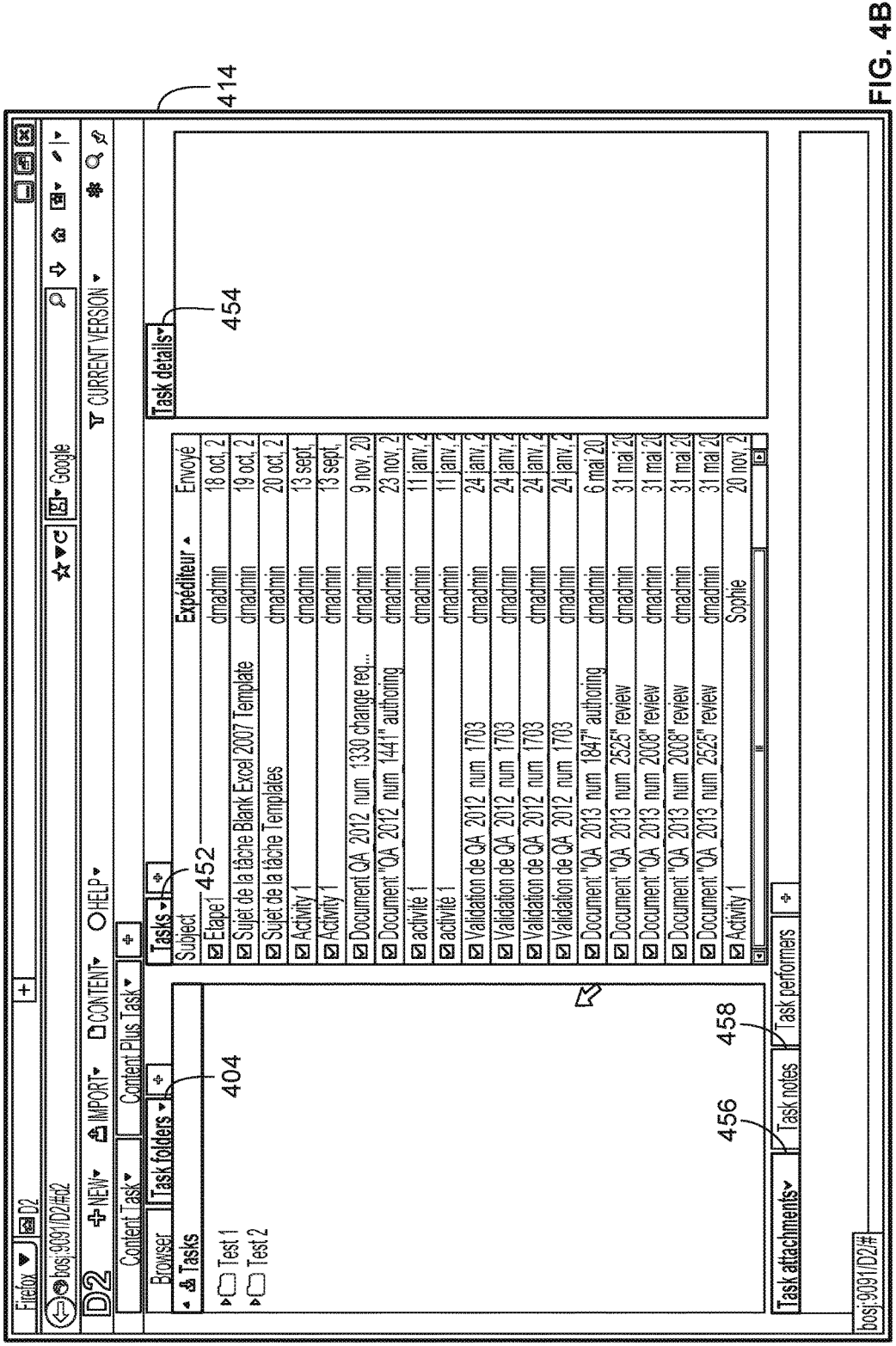
FIG. 4B is a sample screenshot of a task view in a multiview workspace embodiment.

FIG. 4B is a sample screenshot of a task view in a multiview workspace embodiment. In one embodiment this is the sample multiview workspace as that shown in FIG. 4A for the associated project, virtual document, and/or CMS repository. A user may bring the task view in focus from the view of FIG. 4A to that of FIG. 4B, for example by asserting the tasks folder widget 404, or In one embodiment using direct control 414.

By contrast with the single view workspace in FIGS. 3A and 3B, in task view the center layout region, right layout region, and bottom layout region have been changed. The list widget 406 has been replaced, not by a hidden widget like widget 408 but with a new tasks widget 452 (with no other hidden widgets as shown.) Similarly, preview widget 410 has been replaced by a new layout region for task details widget 454. Also similarly, locations widget 412 and its associated hidden widgets have all been replaced by a new layout region for task attachments widget 456, as well as other hidden widgets for tasks like task notes widget 458.

Figure 5A:
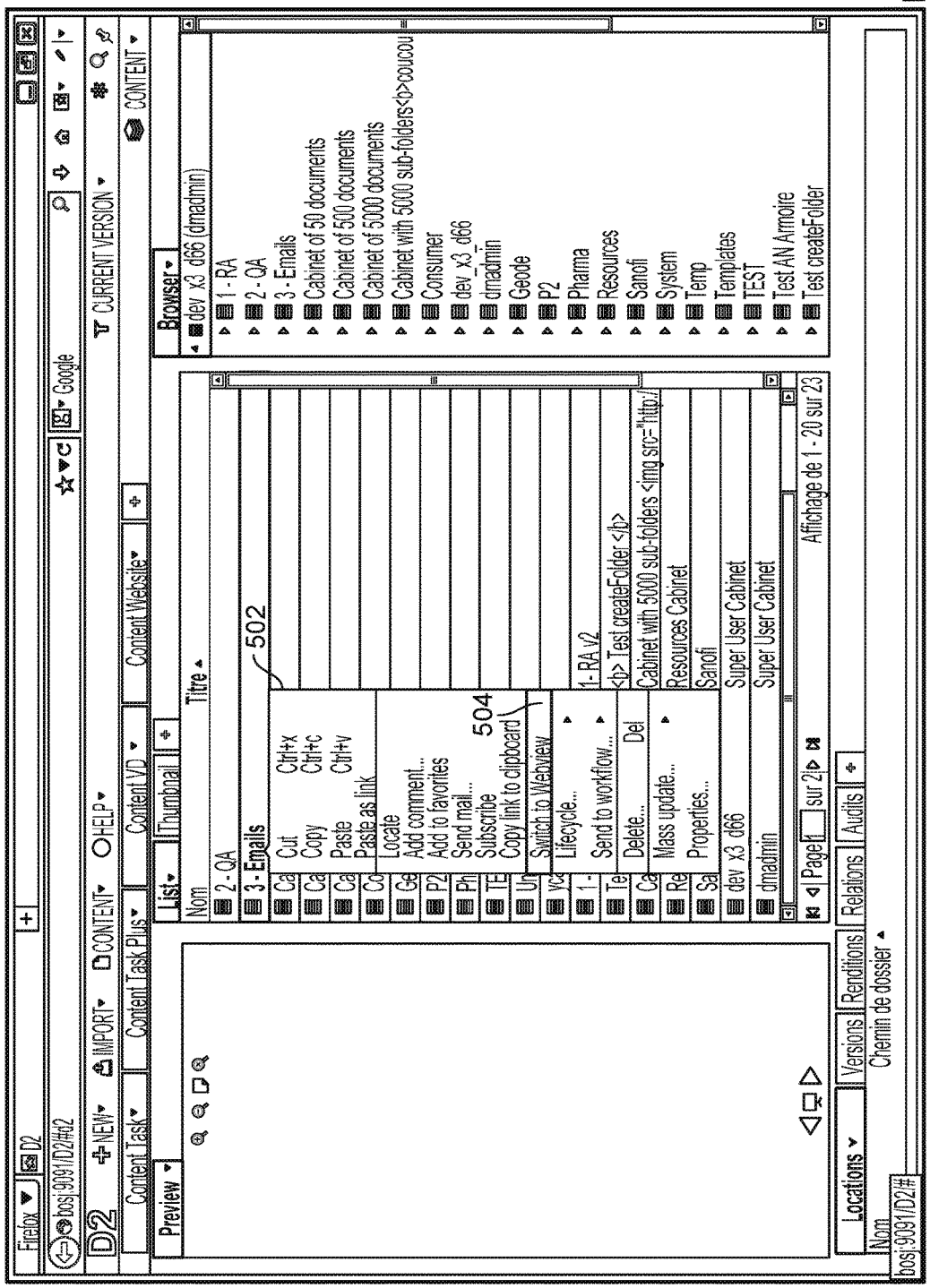
FIG. 5A and FIG. 5B are two sample screenshots of an embodiment of a multiview workspace transition to a web site view.
Figure 5B:
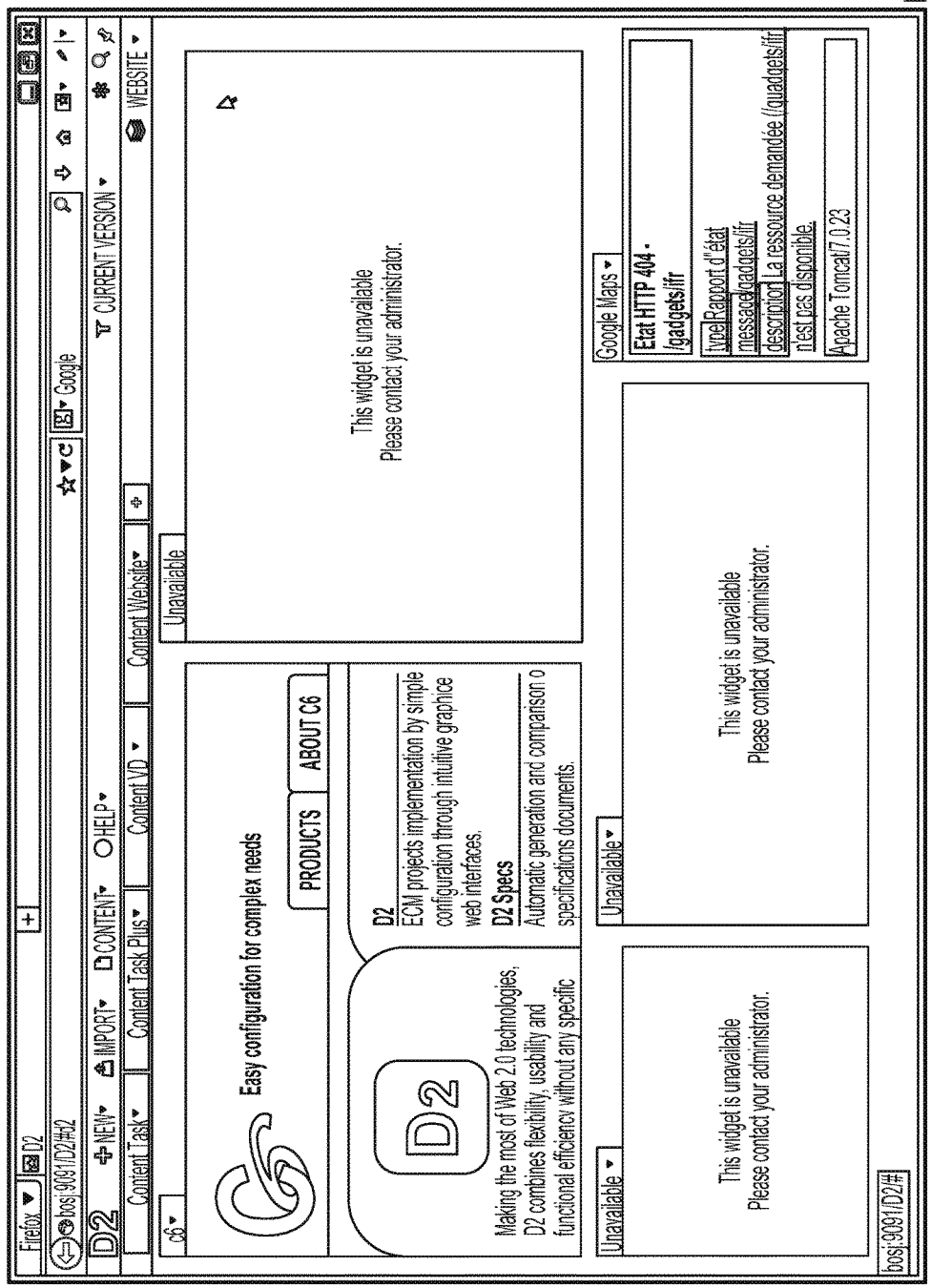

FIG. 5A and FIG. 5B are two sample screenshots of an embodiment of a multiview workspace transition to a web site view. The multiview workspace shown in FIGS. 5A and 5B would be what a user would view from an associated project, virtual document, and/or CMS repository. FIG. 5A is a samples screenshot showing a content view comprising a preview widget, list widget, browser widget and locations widget. The screenshot shows a user opening a context menu 502 in the list browser (for example, by right clicking on "3—Emails"). One of the entries in the context menu 502 is a menu entry 504 to "Switch to WebView". Selecting such a menu entry may bring the user to a web site view, as shown in FIG. 5B. As is shown in FIG. 5B, there may be many focus and/or visual differences between two views such as the content view and the web site view. Another example may be a user running a search from a searches widget and switching the workspace view to a search view. Another example may be a user invoking the "New Content" action from the "Import" menu across the top and switching from a task view to a content view.

Figure 6A:
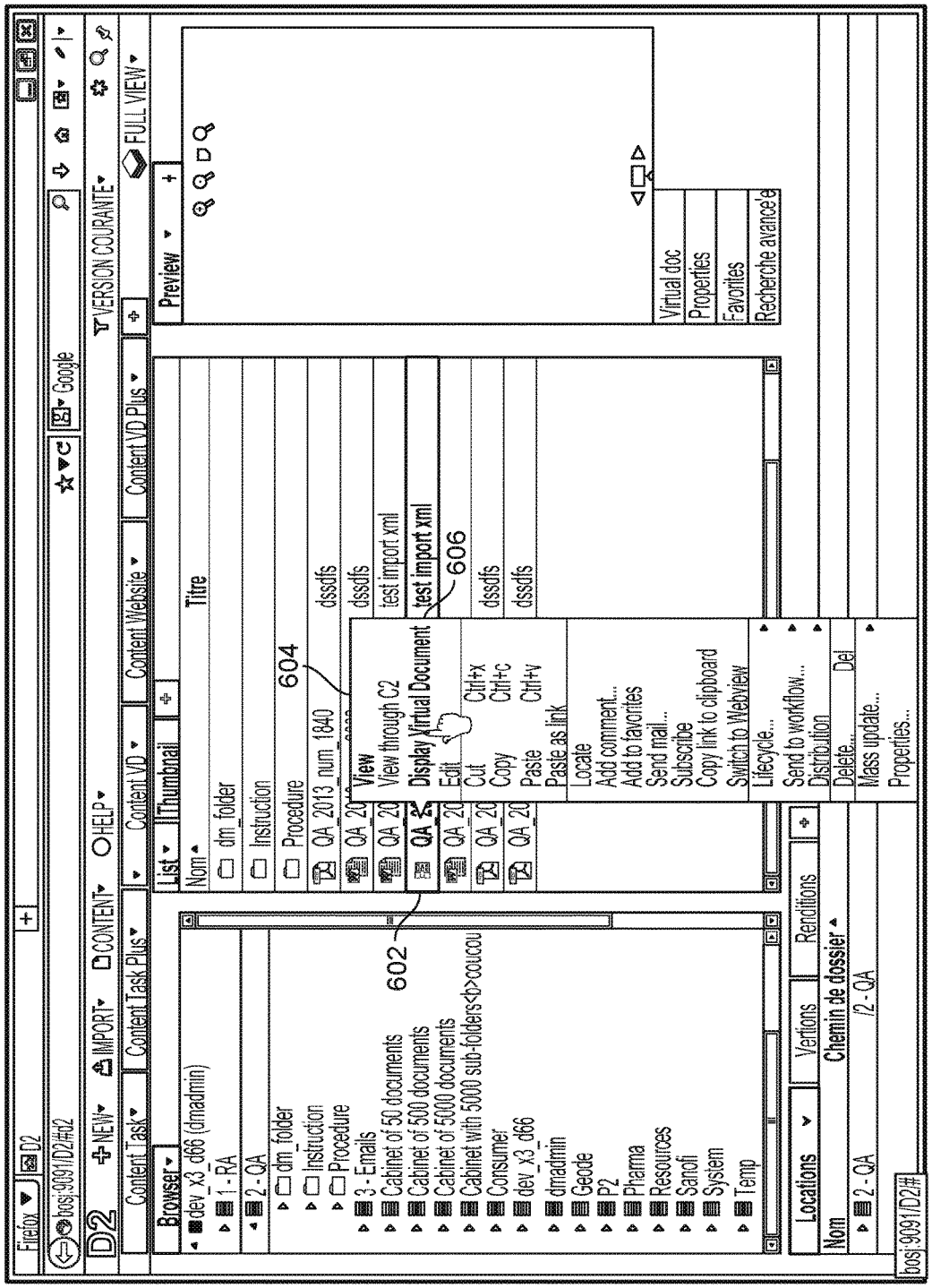
FIG. 6A and FIG. 6B are two sample screenshots of an embodiment of a multiview workspace transition to a virtual document view.
Figure 6B:
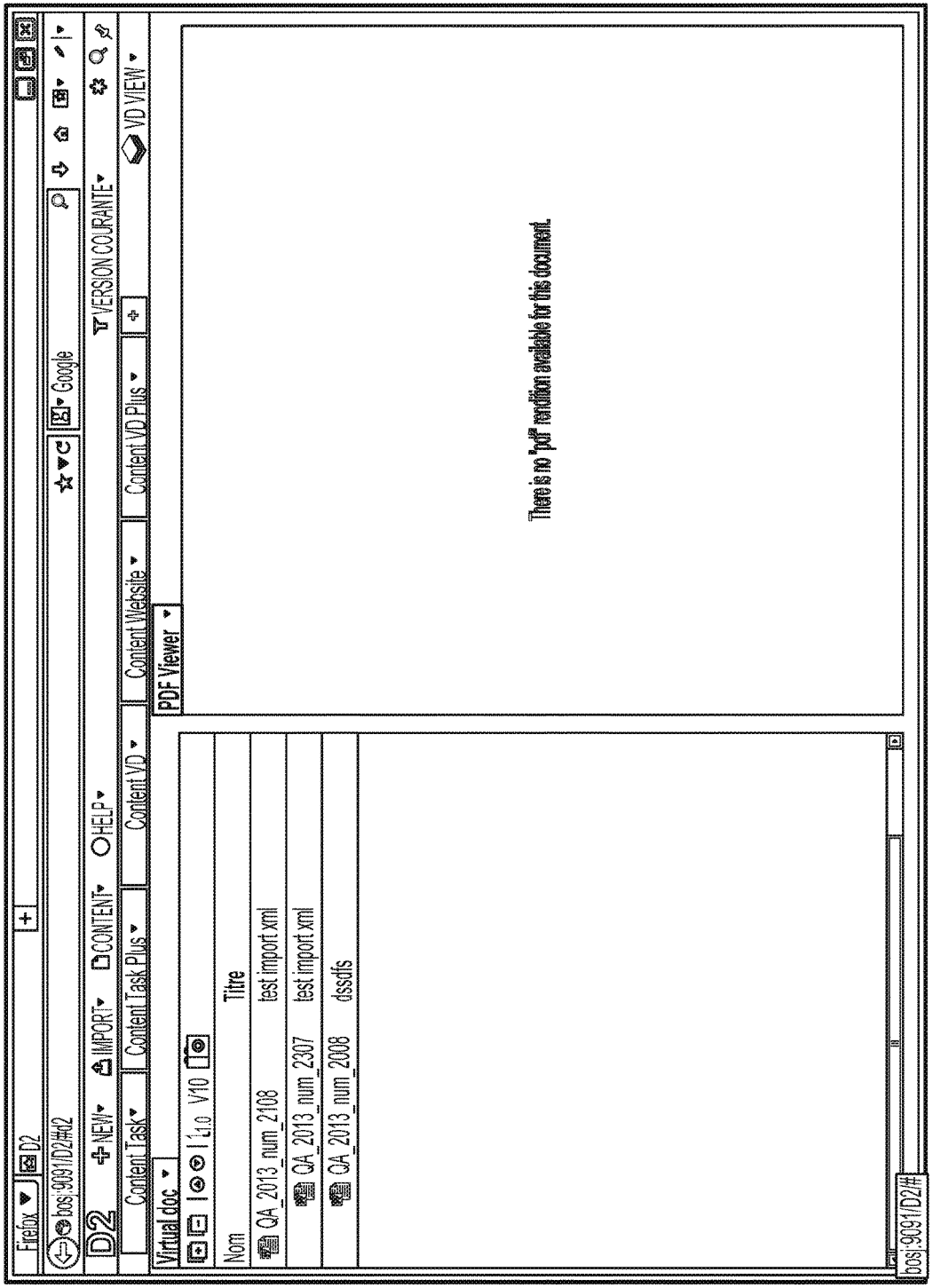

FIG. 6A and FIG. 6B are two sample screenshots of an embodiment of a multiview workspace transition to a virtual document view. The multiview workspace shown in FIGS. 6A and 6B would be what a user would view from an associated project, virtual document, and/or CMS repository. FIG. 6A is a samples screenshot showing a full view comprising a browser widget, list widget, preview widget and locations widget. The screenshot shows a user opening a context menu 604 in the list browser (for example, by right clicking on an entry associated with a virtual document 602). One of the entries in the context menu 604 is a menu entry 606 to "Display Virtual Document". Selecting such a menu entry may bring the user to a virtual document view, as shown in FIG. 6B, including a virtual document widget and a viewer widget, in this case a PDF viewer. As is shown in FIG. 6B, there may be many focus and/or visual differences between two views such as a full view and a virtual document view.

Design-Time

Figure 7:
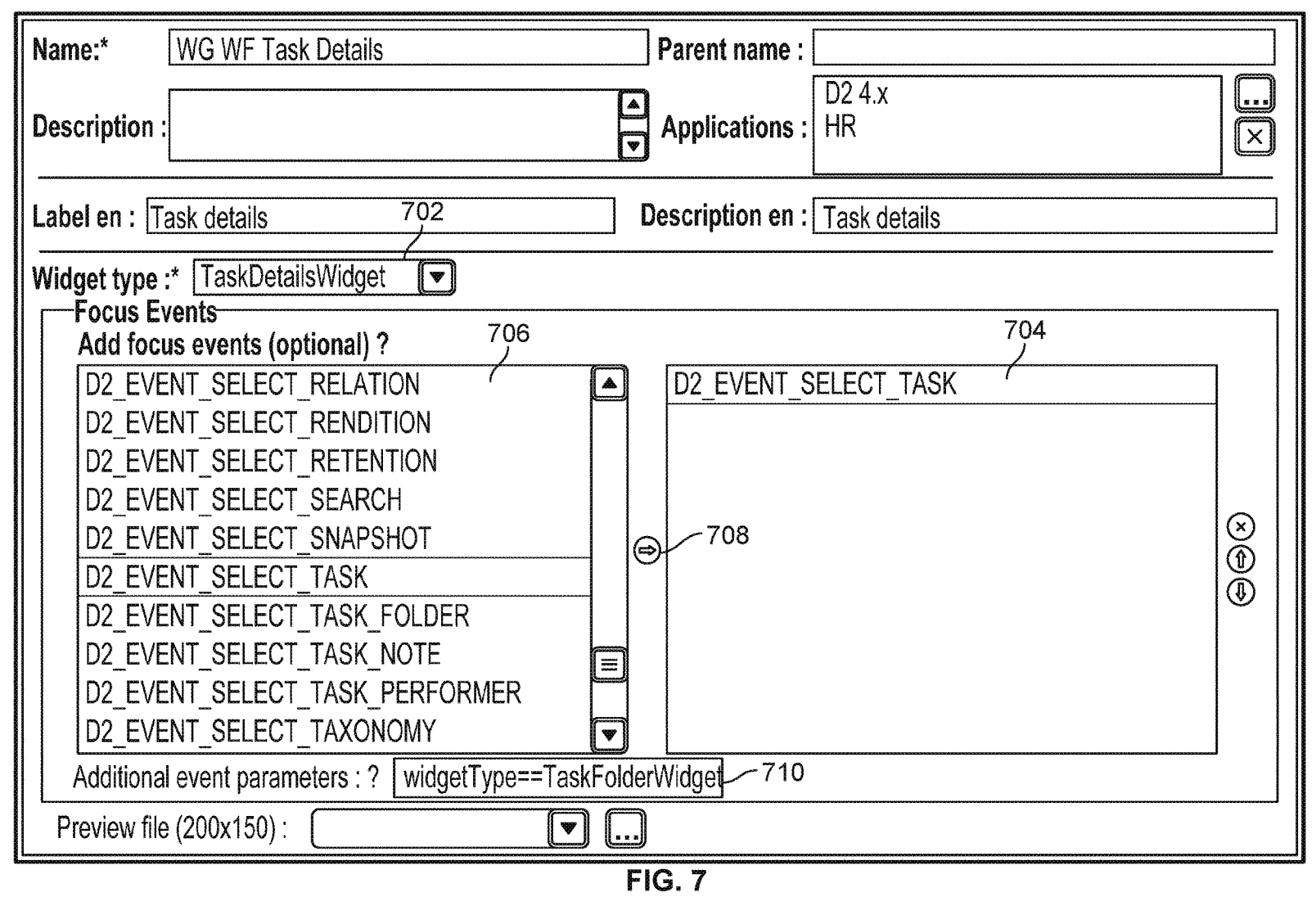

FIG. 7 is a sample screenshot of an embodiment of an event focus configuration at design-time. In one embodiment, a new configuration is added to the client that allows an administrator to define one or more focus communications that will cause a widget in the workspace to gain focus and come to the foreground when a specific UI event occurs. A focus communication can be, for example, a focus event or a focus action related to a UI event and/or UI action.

For example, the document preview widget is only relevant when a document is selected. If the current selection is a folder, the preview is normally blank. Focus events allow the application to be configured to bring the preview forward when a document is selected, and to bring some other widget to the foreground when a folder is selected.

FIG. 7 shows the configuration settings for a task details widget 702 that is set to come into the foreground when a task is selected, represented by event "CLT_EVENT_SELECT_TASK" 704. In one embodiment, the administrator has configured this by selecting "CLT_EVENT_SELECT_TASK" from a list of available possible focus events 706 and bringing it to the right of the screen 708. The "additional event parameters" 710 allows configuration of filters against the metadata included in the event. In the case shown, the administrator has configured the focus event to only apply when the source of the CLT_EVENT_SELECT_TASK event is a task folder widget.

Figure 8A:
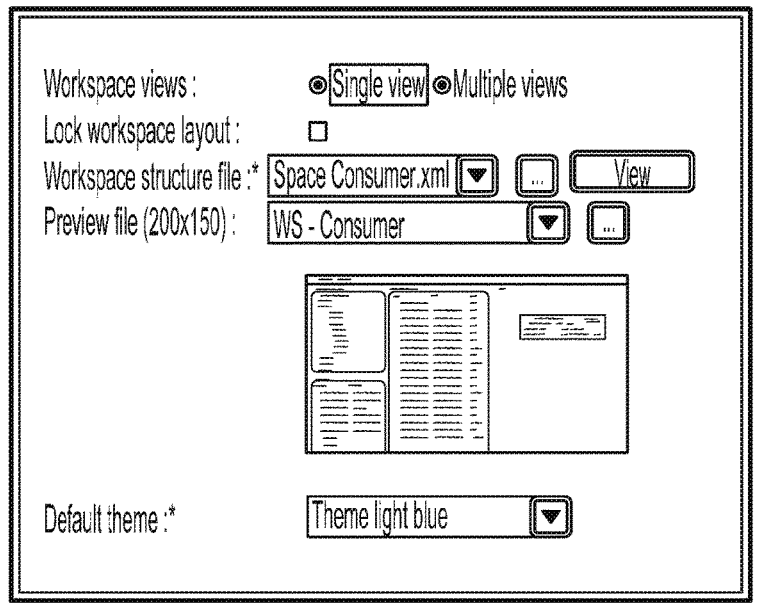
FIG. 8A and FIG. 8B are sample screenshots of an embodiment of a workspace view configuration at design-time.
Figure 8B:
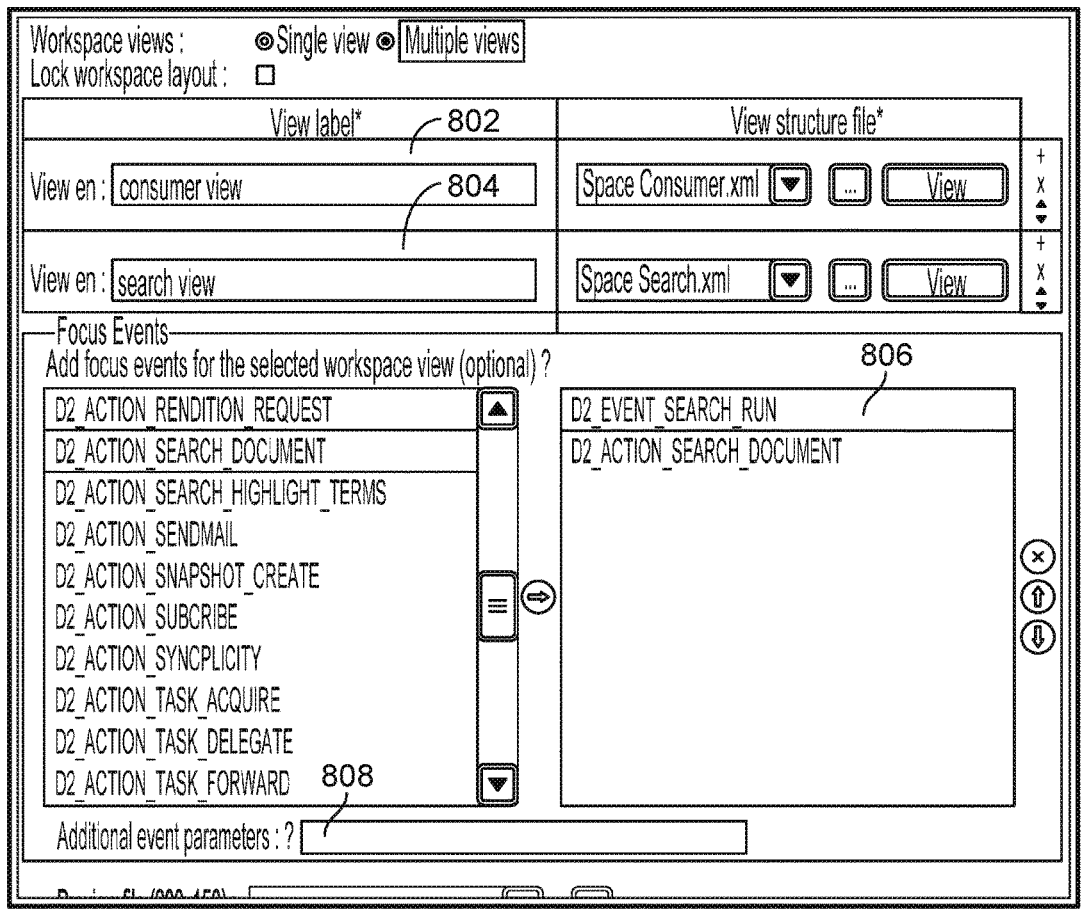

FIG. 8A and FIG. 8B are sample screenshots of an embodiment of a workspace view configuration at design-time. Traditionally, each workspace may correspond to a single layout as shown in FIG. 8A. For example, FIG. 8A shows a single workspace view represented by a workspace structure file, "Space Consumer.xml". In such cases, the end user may switch widgets in the layout manually, but the overall layout of the UI does not change unless the user selects a different workspace.

By contrast, in one embodiment "workspace views" are introduced as shown in FIG. 8B. Each view is represented by a separate layout file referenced in the workspace configuration. For the example shown, two views are configured. The first is a consumer view with structure file "Space Consumer.xml" that is shown white 802, meaning it is currently selected and/or highlighted for focus event configuration. The second is a search view with structure file "Space Search.xml" that is shown shaded 804 or unselected. That is, workspace views can have "focus events" just like widgets allowing the administrator to define specific events that will cause views to switch automatically in response to certain UI events. The example shown in FIG. 8B shows the consumer view workspace that is configured to switch into search view for example whenever a search is run, associated with event 806 "CLT_EVENT_SEARCH_RUN". Just like focus events for widgets, additional event parameters 808 can be specified to filter focus events for views, based on the metadata payload of the UI event.

Traditionally clients may use workspace view and/or workspace views that switch the UI layout in response to UI events. By contrast, In one embodiment the system defines UI switching behaviors entirely through configuration at run-time.

FIG. 9 is a block diagram illustrating an embodiment of reconciling focus communication. In one embodiment, views may be switched within a workspace either because another view has a focus event, or because a widget in another view has a focus event, or both. In some cases, when an event fires, it will match the focus events for multiple views and widgets, and it must be decided which view to display, and what widget will gain focus.

In one embodiment, a prioritized set of tests determines which widget and which views will gain focus. Tests are evaluated from Case 1 (902), to Case 2 (904), to Case 3 (906), to Case 4 (908) until one test passes, although in various embodiments cases may be re-ordered, added to, or deleted from.

Case 1 (902) states that if another view V1 contains a widget W such that both V1 and W1 have the current UI event set as a focus event, and V1 and W have matching additional event parameters, then set the view to V1 and focus to W. Case 2 (904) states that if the current view V0 contains a widget W such that W has the current event set as a focus event, then keep the view as V0 and focus to W. Case 3 (906) states that if another view V1 contains a widget W such that W has the current event set as a focus event, then set the view to V1 and focus to W. Case 4 (908) states that if another view V1 has the current event set as a focus event, then set the view to V1.

EMBODIMENT OF A SPECIFICATION

Overview

In one embodiment, context sensitive widget behavior allows the interface to activate or display widgets based on focus events, for example selection, creation, and focus, or actions, for example open, display, comment, and locate. Multiple actions and events may be associated with any widget. Multiple widgets may be called from an individual action or event. Related widgets are activated or displayed based on priority order set in the layout XML.

In one embodiment, workspace configuration also allows the administrator and/or application designer to build a workspace view containing widgets that are visible or hidden by default. Hidden widgets are made visible and/or set to active in the workspace region they are placed in by the application designer in the UI layout XML file.

Examples

"Display Virtual Document" action activates the Virtual Document widget and snapshots widget;
"Locate" actions activates the locations widget;
"Save Advanced Search" activates the saved searches widget;
Content selection may activate the preview widget; and
Folder selection may activate the properties widget.

Figure 10:
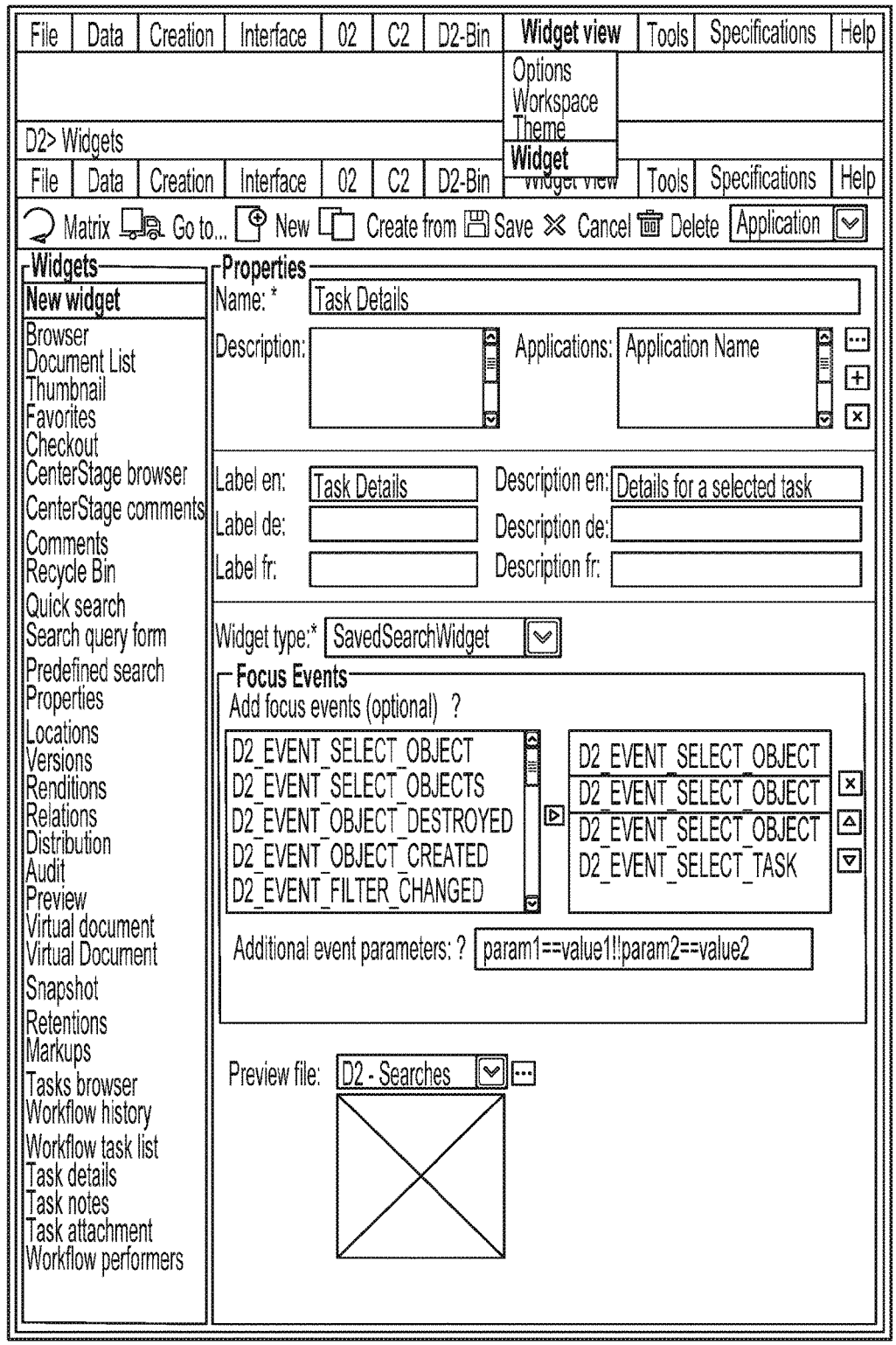
FIG. 10 is a sample interface of an embodiment for a widget editor template configuration.

In one embodiment, the administrator can also lock a workspace layout in a Configuration by selecting the option, for example a checkbox, on the workspace template. In the client the following may occur:
  The "add widget+" tab becomes hidden with no access to the widget gallery;
  Widget tab menu omits the options to hide and close widgets;
  Drag and drop gestures are disabled for moving widgets around;
  Focus actions still work to make visible widgets become active; and
  Widgets that are hidden in the default XML layout are still hidden and become visible and active on focus events. Once visible that cannot be closed or hidden again.
Configuration
  FIG. 10 is a sample interface of an embodiment for a widget editor template configuration. In one embodiment, widget relationships are set in the widget editor template configuration as shown in FIG. 10. Workspace configuration also allows the application designer to build a workspace containing widgets that are visible or hidden by default. Hidden widgets are made visible and/or set to active in the workspace region they are in by the application designer in the UI layout XML file.

In one embodiment, when configuring widgets the admin is able to associate events and actions that the widget would listen for. When any associated events or actions are performed by a user the in a workspace the widget will respond accordingly by becoming visible and/or become active (in focus). If the workspace does not include the widget associated with the event or action the behavior is the same as traditional behavior where nothing happens and the user must add the widget from the widget gallery.

Figure 11:
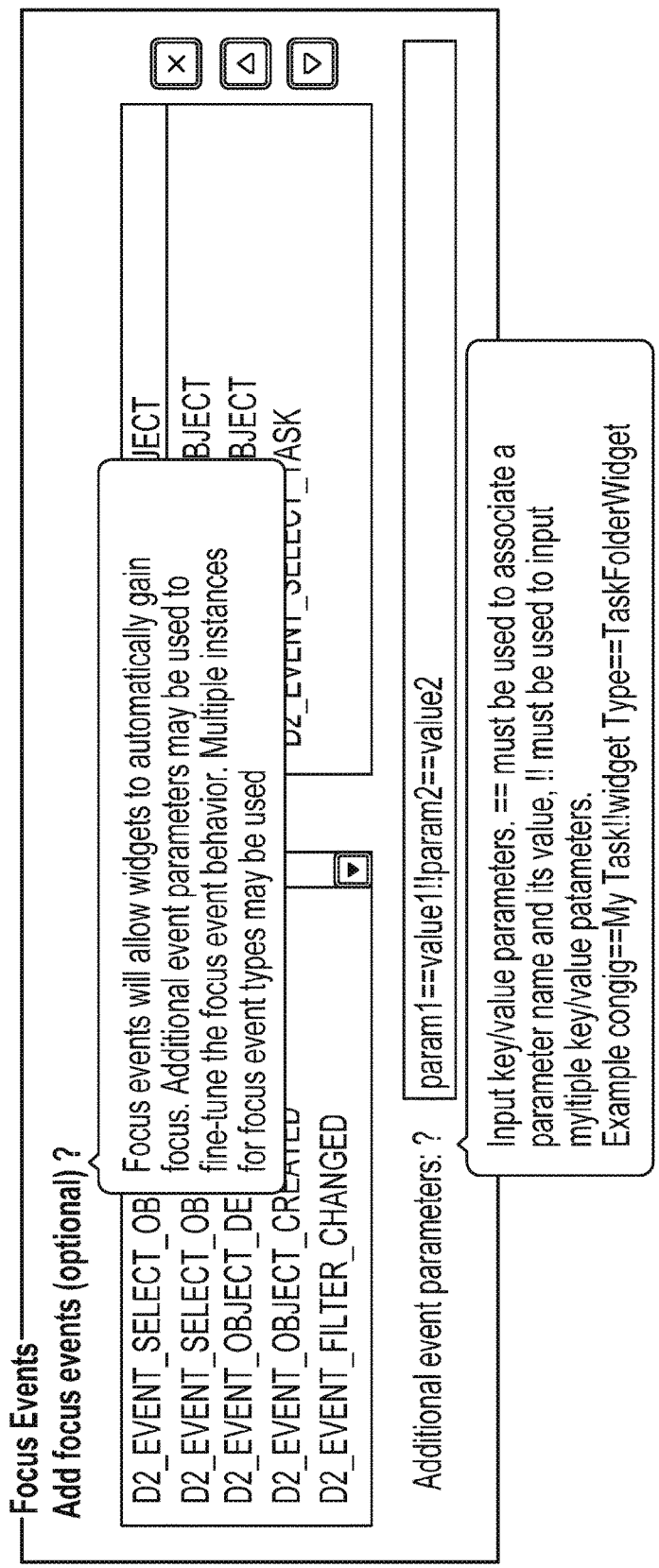
FIG. 11 is a sample interface of an embodiment for a focus event section.

In one embodiment, the interaction for associating actions and events is based on the "Communication Channel" control that may currently exist for external widgets. "Communication Channel" is also known as "Focus Events" throughout this specification. Additional events and actions are needed as described below to cover more context sensitive widget needs.
Focus Events
  FIG. 11 is a sample interface of an embodiment for a focus event section. The section shown in FIG. 11 may in one embodiment be a part of the configuration shown in FIG. 10.

In one embodiment, for a widget to listen and automatically respond in the client UI the administrator may select actions and/or events and add them to the selections list. If the selections list is empty then no response may be expected. The list of available events and actions are the same used for workspace views. Additional focus event parameters may be added to fine tune the behavior, for example: event=select object and parameter=object format, type or property.

In one embodiment, the "Focus Events" section displays the event configuration for the specified widget, for example:
  Fieldset
    Label: Focus Events
    Introductory text: "Add focus events (optional)"
      Include a help tip icon, for example a question mark, with a message tip on hover
      Message: "Focus events will allow widgets to automatically gain focus. Additional event parameters may be used to fine-tune the focus event behavior. Multiple instances for focus event types may be used."
  Left list panel displays a flat list of available actions and events that may be used as selections
  Right panel displays a flat list of focus events that have been selected from the left list
  Focus events may be added as selections multiple times
In one embodiment, adding focus event selections can be performed within the interface as follows:
  Focus events may be added to the selections list using the following gestures
    Double-click any focus event in the left list to add it to the selections list on the right
    Select any focus event in the left list then click the arrow button [>] between the lists to add the selected event
  When adding focus event selections the items are not "Moved" but are 'Added" to the selections list. The left list of "Source" focus events is complete. The right list contains the items "Added" from the source list. Items may be added multiple times using the same gestures above
  Use the arrow button to move selections
In one embodiment, removing, and reordering focus events may be performed within the interface as follows:
  Include three icons aligned vertically on the right of the selected events list for removing, and reordering
  Icons are the same as used in several other lists in Config templates
  Remove: [x] icon (position 1)
    Always enabled
    Click the remove button [X] to remove selected focus events from the list.
    Allow multi-selection
  Reorder focus events
    Selected focus events may be reordered in the list as needed for organization or to allow selections to take priority as needed
    Use the arrow button icons currently used in similar CLT interactions for the controls to reorder selections
    Move up: current selection in listbox is moved up
    Move down: current selection in listbox is moved down
  In one embodiment, the order of the focus events is the priority order in which a series of events is parsed.
  In one embodiment, additional event parameters may be address within the interface as follows:
    Event parameters allow the administrator to fine-tune selected focus events Field only shows when a focus event selection is selected Parameters are added by typing the parameter values in to the text field For example, similar to event message parameters used for external widgets Event parameters are optional Label: Additional Event Parameters:

Include a help tip icon, for example a question mark, with a message tip on hover Message: Input key/value parameters. == must be used to associate a parameter name and its value, !! must be used to input multiple key/value parameters. Example config==My Task!!widgetType==TaskFolderWidget Control: Text input Width: fluid, 100%

The controls for Preview are not necessarily changed from traditional clients. The base configuration provided to the client user may include common context sensitive widget behavior to help the application designer and/or administrator.

Layout XML

In one embodiment, any number of widgets are allowed to be included in a container. Items are visible or hidden by default. To hide an item the administrator may include a tag for the widget as <widget config='task browser' hidden='true'/>, as seen in the example below:

Hidden widget becomes visible and set in focus when called by a configured action or event Actions and events are configured in the widget editor in Config;

If a widget is moved, for example drag and dropped, to a new region in the workspace the new location is remembered and updated in the XML. This may be persistent or only for the session If a widget is "removed" from the workspace it is no longer in the XML but may be re-added from the widget gallery by a user At least one widget must be visible in any region/container. If all are hidden in the XML then display the first/top widget by default If a widget is configured in the layout without a container then it is treated as being a single widget, thus remove and hide options are disabled.

When a workspace is opened it may always default to its configured layout. User modifications and context sensitive updates are not persistent FIG. 12 is a sample XML layout. In FIG. 12 points of interest with regards to hidden widgets (1202, 1204, 1206) and virtual documents 1208 are highlighted.

Locked Workspaces

In one embodiment, the administrator may lock a workspace layout in Config by selecting the option, for example a checkbox, on the workspace template:

Adds a checkbox control in the workspace template in Config.

Positions the checkbox under the workspace structure field.

Label: Lock workspace layout

In one embodiment, when checked the following occurs in the client:

The "add widget+" tab is hidden, with no access to the widget gallery

Widget tab menu omits the options to hide and close widgets

Drag and drop gestures are disabled for moving widgets around

Focus actions may still work to make visible widgets become active

Widgets that are hidden in the default XML layout may still be hidden and become visible and active on focus events Once visible that cannot be closed or hidden again Runtime Behavior In one embodiment, widgets that are either configured as part of a workspace layout (visible or hidden) by the administrator in the XML, or that have been added from the widget gallery, may respond to events or actions configured using the new "Focus Events" in the widget editor in Config and/or Config tools:

When a widget is visible and has focus events configured the widget may respond by becoming active When a widget is hidden and has focus events configured the widget may respond by becoming visible and active in the region where it is located in the XML file If multiple widgets are associated with an action or event then the widget in each container or region that appears first in the XML for that container will display If a widget is not available in the workspace, even if it has focus events configured, nothing may happen in the UI. The user may add the widget manually from the widget gallery. Widgets may be part of the workspace to respond. If the widget is not part of the workspace layout then no message or response may occur and the user may need to add the widget from the gallery for the desired action/event If a focus event is configured for a widget that is in another workspace view, switch to the view containing the target widget, then set the focus to the target widget in that view.

Only one instance of a widget may be displayed in a workspace view

Figure 13:
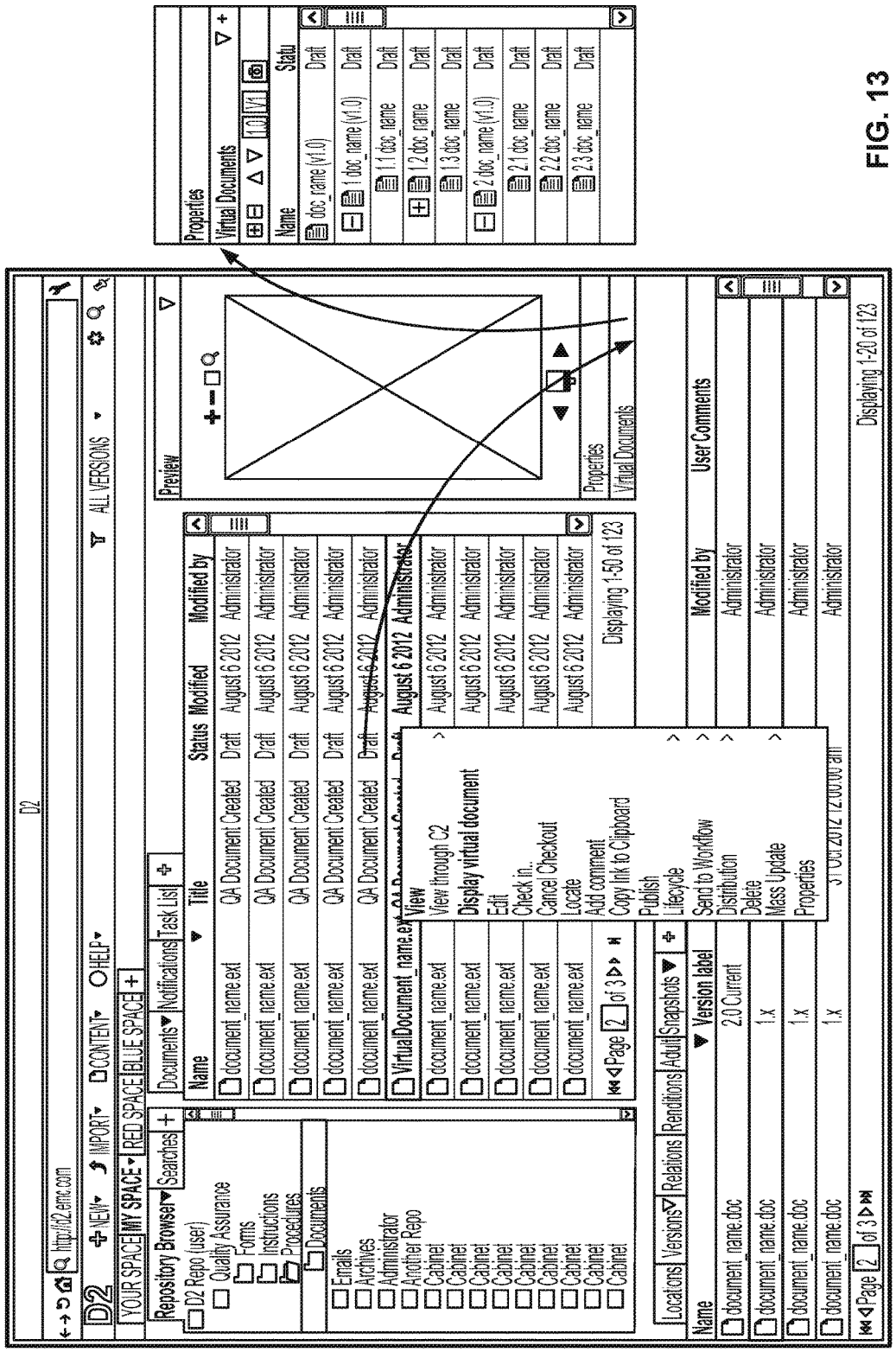
FIG. 13 is a sample interface of an embodiment for run-time behavior associated with a visible widget.

FIG. 13 is a sample interface of an embodiment for run-time behavior associated with a visible widget. In one embodiment, the widget is visible in the workspace.

A user runs an action, selects an object type, or performs some gesture associated with focus events configured for a widget. The related widget detects the event and responds by becoming active in the container it is currently in.

Figure 14:
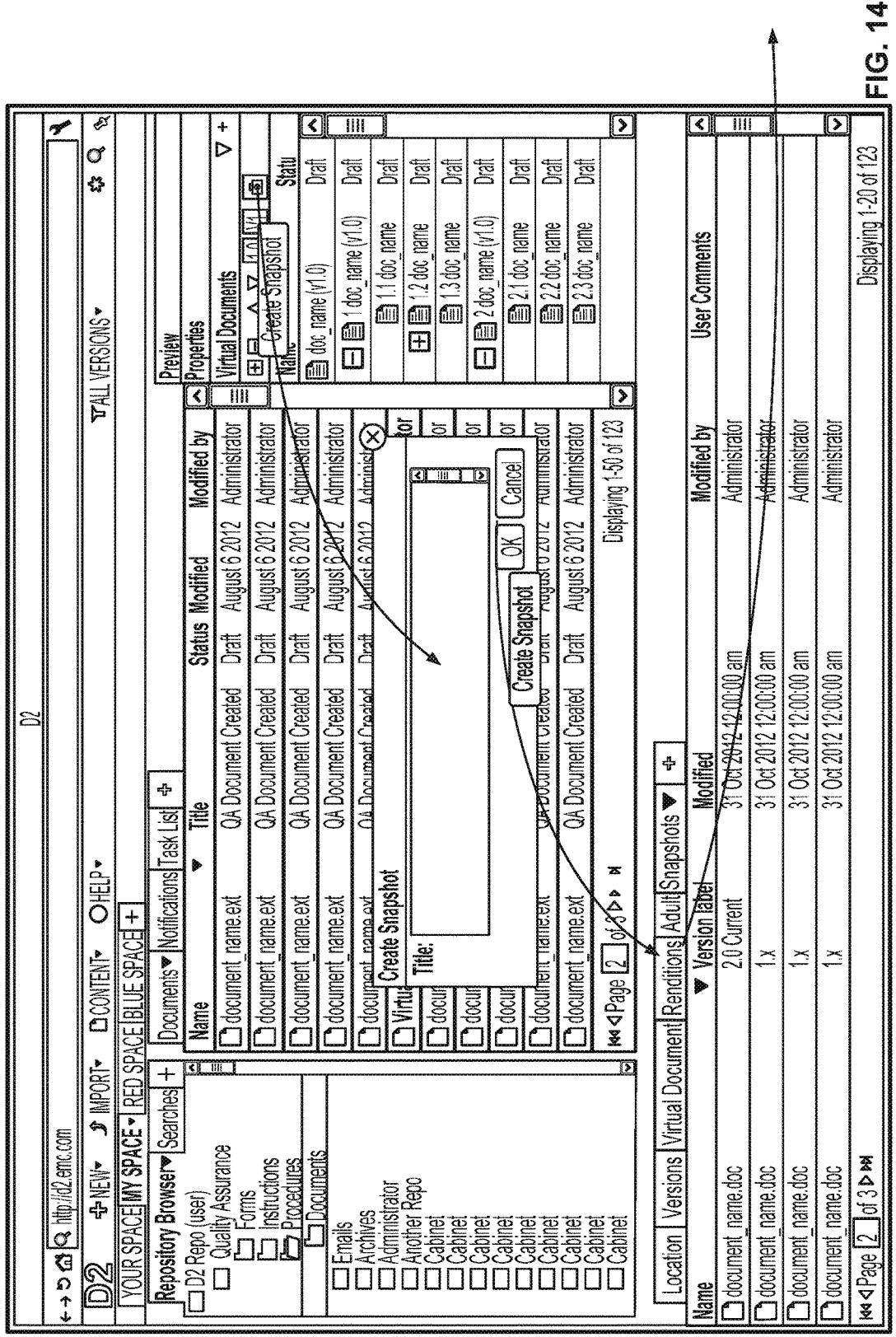
FIG. 14 is a sample interface of an embodiment for run-time behavior associated with a hidden widget.
Figure 14:
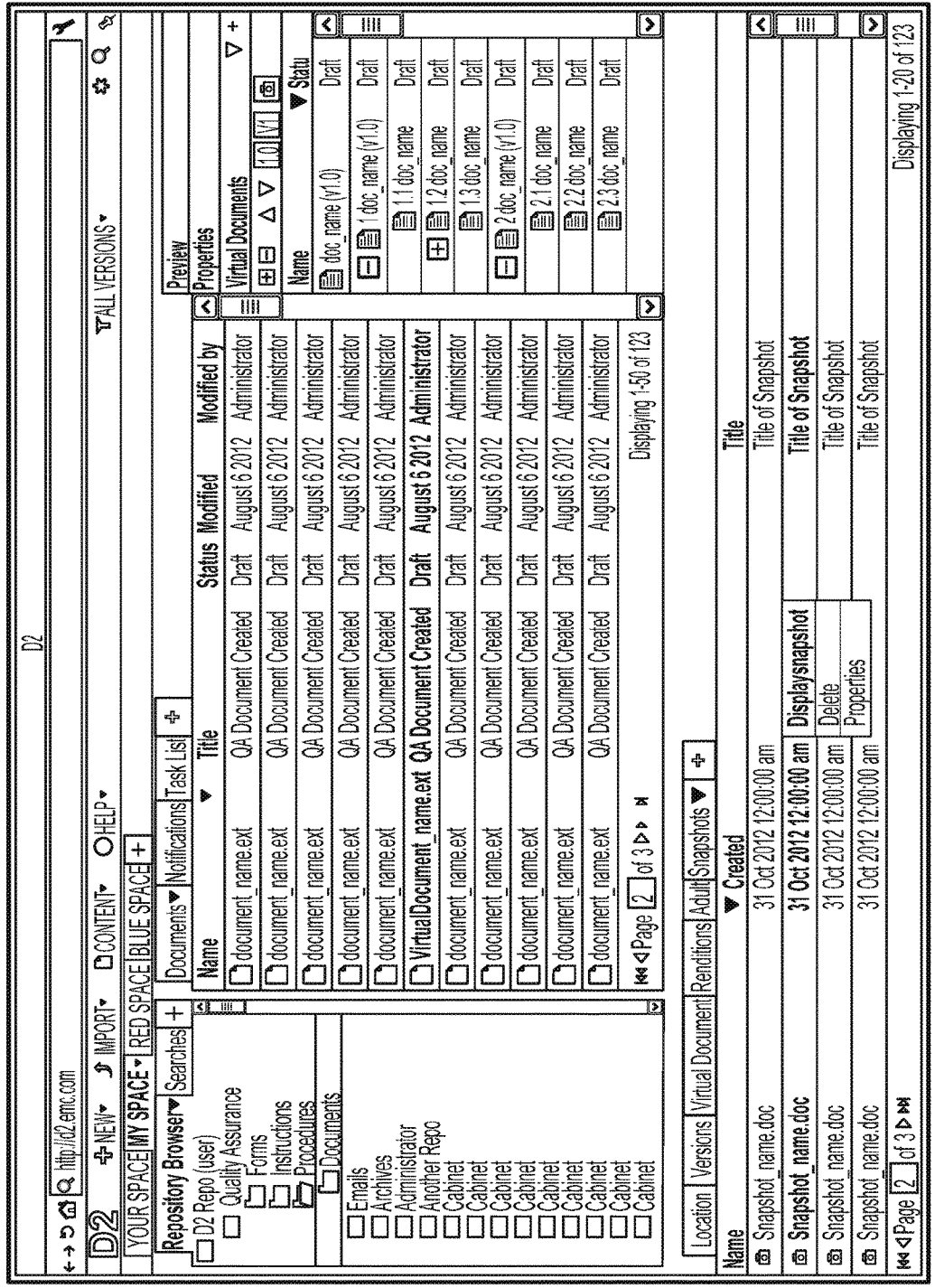

FIG. 14 is a sample interface of an embodiment for run-time behavior associated with a hidden widget. In one embodiment, a widget is available in the workspace and it is hidden. A user runs an action, selects an object type, or performs some gesture associated with focus events configured for a widget. The related widget detects the event and responds by becoming visible and active in the container it is currently in. Throughout this specification a "container" may refer to a tab group and/or an accordion bar.

Focus Events

In one embodiment, a focus event is configured by selecting events and/or actions from the available list. Widgets may be configured to respond to multiple focus events and any focus events may be configured on multiple widgets.

The base configuration provided to a client user will include common context sensitive widget behavior to help the application designer and/or administrator.

Examples include:

Widget Focus Event Configurations

| Repository Navigation Widgets | | |
|---|---|---|
| Internal Widgets | Widget Description | Focus Events (Parameters) |
| Browser | Displays cabinets and folders. | |
| List | Enables uncluttered browsing of a repository tree. | CLT_EVENT_OBJECT_CREATED |
| | Displays content and virtual documents. | CLT_EVENT_SELECT_OBJECT (parameter = object name, format, type) |
| | Enables full browsing and content-seeking capabilities. | CLT_EVENT_SELECT_SEARCH |
| | Use this widget to access the content context menu. | CLT_EVENT_SELECT_FACET |
| | Displays results from Quick search and Predefined search widgets. | CLT_EVENT_SELECT_QUERYFORM |
| | | CLT_ACTION_OPEN_FOLDER CLT_EVENT_SEARCH_RUN |
| Thumbnail | Enables thumbnail previews for browsing content. | |
| Favorites | Displays a list of content marked as favorite. | CLT_ACTION_ADD_FAVORITE |
| Checkout | Displays a list of checked-out content with user name and time of checkout. | |
| CenterStage browser | Enables browsing of CenterStage spaces. Only displays the Collaboration folder. | |
| CenterStage-Comments | Displays comments added to content and data tables selected in the CenterStage browser widget. | |
| Comments | Enables viewing, creating, and replying to comments about content. | CLT_ACTION_COMMENT CLT_EVENT_COMMENT_ADDED |
| Recycle Bin | Displays deleted content and folders. | |

| Search Widgets | | |
|---|---|---|
| Internal Widgets | Widget Description | Focus Events (conditions) |
| Quick search | Enables full-text searches. | |
| Search query form | Enables using pre-configured query form searches. Administrators configure an instance of the search query form widget for each query form option. Select the widget instance that matches the query form search you want to use. | |
| Predefined search (CHANGE NAME TO SAVED SEARCHES) | Enables predefined and past searches. | CLT_EVENT_SEARCH_SAVED CLT_EVENT_SEARCH_RUN |
| | | CLT_EVENT_SEARCH_CATEGORY_CREATED |

| Content Properties Widgets | | |
|---|---|---|
| Internal Widgets | Widget Description | Focus Events (parameters) |
| Properties | Displays properties of the selected content. | CLT_EVENT_SELECT_OBJECT (parameter = object name, format, type) |
| | Properties cannot be changed using this widget. | CLT_EVENT_SELECT_TAXONOMY |
| | | CLT_EVENT_SELECT_DICTIONARY CLT_EVENT_SELECT_USER CLT_EVENT_SELECT_GROUP |
| Locations | Displays a list of directory locations in which the selected content are found. | CLT_ACTION_LOCATE_OBJECT (parameter = object name, format, type) CLT_ACTION_LOCATE_TASK CLT_ACTION_LOCATE_SEARCH CLT_ACTION_TAXONOMY_LOCATE |
| Versions | Displays a list of the versions of the selected content. | |
| Renditions | Displays a list of renditions of the selected content. | CLT_EVENT_RENDITION_ADDED |
| Relations | Displays a list of what is linked to the selected content. This widget manages content distribution by allowing you to start distributions, edit the list of recipients, and | CLT_ACTION_RELATION_CREATE |

Content Properties Widgets

| Internal Widgets | Widget Description | Focus Events (parameters) |
|---|---|---|
| Distribution | generate reports. Displays a list of distributions sent to the user. This widget allows you accept, reject, and stop distribution tasks. | |
| Audit | Displays a list of audited actions for the selected content. | |
| Preview | Displays the selected content as a slideshow. | CLT_ACTION_LOCATE_OBJECT (parameter = object name, format, type) |
| PDF VIEWER | Displays the selected PDF | CLT_ACTION_LOCATE_OBJECT (parameter = object name, format, type) |
| Virtual document | Displays Virtual Document structure. | CLT_ACTION_OPEN_VD CLT_ACTION_CONVERT_VD CLT_ACTION_OPEN_SNAPSHOT |
| Virtual Document Snapshot | Displays Virtual Document snapshots. | CLT_EVENT_SELECT_SNAPSHOT CLT_ACTION_SNAPSHOT_CREATE |
| Retentions | Displays archiving policies for the selected content. | |
| Markups | Displays markup policies for the selected content. | |

Workflow Widgets

| Internal Widgets | Widget Description | Focus Events |
|---|---|---|
| Tasks browser | Displays a list of tasks sorted by category that have been assigned to you. Use this widget to refresh the Workflow task list widget. | |
| Workflow history | Displays a list of past and current events to show workflow progress. You must have at least queue manager permission to access this widget. | |
| Workflow task list | Displays a list of tasks that have been assigned to you. Use this widget to access the workflow context menu. | CLT_EVENT_SELECT_TASK_FOLDER |
| Task details | Displays the subject and message of selected task. | CLT_EVENT_SELECT_TASK CLT_EVENT_SELECT_TASK_NOTE |
| Task notes | Displays a list of accompanying notes to the selected workflow. | CLT_EVENT_SELECT_TASK CLT_ACTION_TASK_NOTE |
| Task attachment | Displays a list of content attached to the selected task. | CLT_EVENT_SELECT_TASK |

Workflow Widgets

| Internal Widgets | Widget Description | Focus Events |
|---|---|---|
| Workflow performers | Displays a list of users organized by groups assigned to the workflow. | CLT_ACTION_WORKFLOW_UPDATE_PERFORMERS |

Administration Widgets

| Internal Widgets | Widget Description | Focus Events |
|---|---|---|
| User | Displays a list of users for the repository. Use this widget to add and edit user accounts and to change group memberships. | CLT_EVENT_USER_CREATED<br>CLT_ACTION_USER_CREATE |
| Group | Displays a list of user groups for the repository. Use this widget to add and edit user groups. | CLT_EVENT_GROUP_CREATED<br>CLT_ACTION_GROUP_CREATE |
| Dictionaries | Displays a list of repository dictionaries. Use this widget to view, export, and configure dictionaries and values. | |
| Taxonomies | Displays a list of repository taxonomies. Use this widget to view, export, and configure taxonomies and values. | |

Communication Channel Sources

Focus events are based on the same list of actions used in the communication channels for external widgets. Examples include:

Focus Events

| Event Channels | Event Description | Notes |
|---|---|---|
| CLT_EVENT_CUSTOM | | |
| CLT_EVENT_SELECT_OBJECT | An object has been selected - it can be a folder or a document. parentId: ID of the parent object | Parameters will need object name format, or type |
| CLT_EVENT_SELECT_OBJECTS | Multiple objects have been selected parentId: ID of the parent object | Not sure if multiple selection applies to any widgets |
| CLT_EVENT_OBJECT_DESTROYED | An object has been destroyed. It can be a folder, a document, etc. | |
| CLT_EVENT_OBJECT_CREATED | An object has been created. It can be a folder, a document, etc. | Doclist widget |
| CLT_EVENT_COMMENT_ADDED | | Comments widget |
| CLT_EVENT_FILTER_CHANGED | | |
| CLT_EVENT_CHECKOUT_STATE_CHANGED | A document checkout state has been changed | |
| CLT_EVENT_PREFERENCES_CHANGED | | |
| CLT_EVENT_PREFERENCES_LOADED | | |
| CLT_EVENT_WIDGET_GET_FOCUS | A widget get the focus | |
| CLT_EVENT_WIDGET_FOCUS | | Parameters will need widget configured name or type |
| CLT_EVENT_SEARCH_RUN | A search has been RUN | Saved searches widget Doclist widget |
| CLT_EVENT_SEARCH_SAVED | A search has been saved | Saved searches widget |
| CLT_EVENT_SEARCH_CATEGORY_CREATED | A search category has been created | Saved searches widget |
| CLT_EVENT_WORKFLOW_ABORTED | A workflow has been aborted | |
| CLT_EVENT_SELECT_TASK | A task has been selected | Activate task details, task attachments, task notes |
| CLT_EVENT_SELECT_TASK_FOLDER | A task folder has been selected | From task browser activate task list |
| CLT_EVENT_SELECT_TASK_NOTE | A task note has been selected | |
| CLT_EVENT_SELECT_TASK_PERFORMER | | |
| CLT_EVENT_TASK_READ_STATE_CHANGED | The read state of a task changed | |
| CLT_EVENT_TASK_PRIORITY_CHANGED | The priority of a task changed | |

Focus Events

| Event Channels | Event Description | Notes |
|---|---|---|
| CLT_EVENT_TASK_PROCESSED | A task has been forwarded or rejected | |
| CLT_EVENT_WIDGET_INITIALIZED | | |
| CLT_EVENT_WORKSPACE_CLOSED | | |
| CLT_EVENT_THEME_CHANGED | | |
| CLT_EVENT_RENDITION_ADDED | A rendition has been added to a document | Renditions widget |
| CLT_EVENT_IFRAME_ACTIVE | | |
| CLT_EVENT_IFRAME_INIT | | |
| CLT_EVENT_SELECT_TAXONOMY | A taxonomy has been selected | Properties widget |
| CLT_EVENT_SELECT_DICTIONARY | A dictionary has been selected | Properties widget |
| CLT_EVENT_SELECT_USER | A user has been selected | Properties widget |
| CLT_EVENT_USER_CREATED | | USERS widget |
| CLT_EVENT_SELECT_GROUP | A group has been selected | Properties widget |
| CLT_EVENT_GROUP_CREATED | | GROUPS widget |
| CLT_EVENT_SELECT_RELATION | A relation has been selected | Relations widget |
| CLT_EVENT_SELECT_RENDITION | A rendition has been selected | Renditions widget |
| CLT_EVENT_SELECT_RETENTION | A retention has been selected | Retentions widget |
| CLT_EVENT_SELECT_MARKUP | A markup has been selected | |
| CLT_EVENT_SELECT_SEARCH | A search has been selected | Doclist widget |
| CLT_EVENT_SELECT_FACET | A facet has been selected | Doclist widget |
| CLT_EVENT_SELECT_QUERYFORM | A query form has been selected | Doclist widget |
| CLT_EVENT_SELECT_DISTRIBUTION | | |
| CLT_EVENT_SELECT_WORKFLOWTRACKER | | |
| CLT_EVENT_SELECT_WORKFLOWACTIVITY | | |
| CLT_EVENT_SELECT_AUDIT | | |
| CLT_EVENT_SELECT_SNAPSHOT | | Snapshots widget |
| CLT_EVENT_VD_TEMPLATE_SELECTED | A VD template form has been selected | |

Focus Actions
Current communication channel actions are listed.

| Action Channels NAME | Channel Details | Notes |
|---|---|---|
| CLT_ACTION_ADD_FAVORITE | | Favorites widget |
| CLT_ACTION_OPEN_FOLDER | Request the opening of a folder in the portal. Parameters: oam_id as the ID of the folder to open | Doclist widget |
| CLT_ACTION_OPEN_VD | Request the opening of a VD in the portal. Parameters: oam_id as the ID of the VD to open | Vdoc widget |
| CLT_ACTION_OPEN_SNAPSHOT | | Snapshot widget |
| CLT_ACTION_OPEN_GROUP | | |
| CLT_ACTION_SEARCH_DOCUMENT | Request to search a particular document | |
| CLT_ACTION_DISPLAY_DIALOG | | |
| CLT_ACTION_EXECUTE_MANAGER | | |
| CLT_ACTION_EXECUTE | | |
| CLT_ACTION_LOCATE_OBJECT | Request locating of an object in the portal. Parameters: oam_id as the ID of the object to locate | Locations widget |
| CLT_ACTION_LOCATE_TASK | Request locating of a task in the portal. Parameters: oam_id as the ID of the task to locate | Locations widget |

-continued

| Action Channels NAME | Channel Details | Notes |
|---|---|---|
| CLT_ACTION_LOCATE_SEARCH | Request locating of a search in the portal. Parameters: oam_id as the ID of the task to locate | Locations widget |
| CLT_ACTION_REFRESH_DOCUMENT | Refresh the widget where the document is displayed Parameters: oam_id as the ID of the document | |
| CLT_ACTION_REFRESH_WIDGET | Refresh the widget with the target_type. Note that for now not all widgets implements the refresh feature | |
| CLT_ACTION_RELOAD_WORKSPACE | Reload the current workspace (using the oam_cuid) | |
| CLT_ACTION_COPY_LINK_IN_CLIPBOARD | Copy the link to the object in the clipboard Parameters: oam_id as the ID of the object to create link of | |
| CLT_ACTION_DUMP | Display a dump of the object Parameters: oam_id as the ID of the object to dump | |
| CLT_ACTION_CONTENT_CHECKIN | Request the checkin of a document Parameters: oam_id as the ID of the document to checkin | |
| CLT_ACTION_CONTENT_IMPORT_AS_VERSION | Request import as version for a document Parameters: oam_id as the ID of the document | |
| CLT_ACTION_CONTENT_CHECKIN_NATIVE_ANNOTATION | Request the checkin of the native annotation of a document Parameters: oam_id as the ID of the document | |
| CLT_ACTION_CONTENT_PRINT | Request print of a document Parameters: oam_id as the ID of the document to print | |
| CLT_ACTION_CONTENT_COMPARE | Request comparison of 2 documents Parameters: oam_id as the ids of the document to compare | |
| CLT_ACTION_CONTENT_EXPORT | Request export of a document Parameters: oam_id as the ID of the document to export | |

-continued

| Action Channels NAME | Channel Details | Notes |
|---|---|---|
| CLT_ACTION_CONTENT_VIEW | Request view of a document Parameters: oam_id as the ID of the document to view | |
| CLT_ACTION_CONTENT_VIEW_NATIVE | Request native view of a document Parameters: oam_id as the ID of the document to view | |
| CLT_ACTION_CONTENT_EDIT | Request edit of a document Parameters: oam_id as the ID of the document to edit | |
| CLT_ACTION_CONTENT_CHECKOUT | Request checkout of a document Parameters: oam_id as the ID of the document to checkout | Checkouts widget |
| CLT_ACTION_CONTENT_CANCEL_CHECKOUT | Request cancel checkout of a document Parameters: oam_id as the ID of the document to cancel checkout for | |
| CLT_ACTION_CONTENT_EDIT_WITH_NATIVE_ANNOTATION | Request edit of a document with native annotation Parameters: oam_id as the ID of the document to edit | |
| CLT_ACTION_CONTENT_VIEW_WITH_NATIVE_ANNOTATION | Request view of a document with native annotation Parameters: oam_id as the ID of the document to view | |
| CLT_ACTION_CONTENT_EDIT_NATIVE_ANNOTATION | Request edit native annotation of a document Parameters: oam_id as the ID of the document to edit | |
| CLT_ACTION_COMMENT | Request display of the comment dialog Parameters: oam_id as the ID of the document to comment parentCommentId as the parent comment | Comments widget |
| CLT_ACTION_CONTENT_CREATE | Request display of the creation dialog Parameters: oam_id as the ID of the base document that can be used for inheritance parentId as the parent folder. This folder is | |

-continued

| Action Channels NAME | Channel Details | Notes |
|---|---|---|
| | used to create the document inside it if no auto link is set | |
| CLT_ACTION_CONTENT_IMPORT | Request display of the import dialog Parameters: oam_id as the ID of the base document that can be used for inheritance parentId as the parent folder. This folder is used to create the document inside it if no auto link is set files as a list of files on the client machine. This will populate the list | |
| CLT_ACTION_FOLDER_CREATE | Request display of the folder creation dialog Parameters: root_object_type set to "dm_folder" or "dm_cabinet" | |
| CLT_ACTION_OBJECT_DESTROY | Request display of the destroy dialog Parameters: oam_id as the ID of the object to destroy parentId as the ID of the object's parent | |
| CLT_ACTION_DISTRIBUTION_ACCEPT | Accept the distribution Parameters: oam_id as the ID of the object config_name as the distribution configuration name | |
| CLT_ACTION_DISTRIBUTION_REJECT | Reject the distribution Parameters: oam_id as the ID of the object config_name as the distribution configuration name | |
| CLT_ACTION_DISTRIBUTION_PREPARE | Prepare the distribution Parameters: oam_id as the ID of the object config_name as the distribution configuration name | |
| CLT_ACTION_DISTRIBUTION_LAUNCH | Launch the distribution Parameters: oam_id as | |

-continued

| Action Channels NAME | Channel Details | Notes |
|---|---|---|
| | the ID of the object<br>config_name as the distribution configuration name | |
| CLT_ACTION_DISTRIBUTION_STOP | Stop the distribution<br>Parameters:<br>oam_id as the ID of the object<br>config_name as the distribution configuration name | |
| CLT_ACTION_DISTRIBUTION_REPORT | Report the distribution<br>Parameters:<br>oam_id as the ID of the object<br>config_name as the distribution configuration name | |
| CLT_ACTION_LIFECYCLE_DCTM | Request an operation on a Documentum lifecycle<br>Parameters:<br>oam_id as the ID of the object<br>operation as the operation to perform<br>policyId as the ID of the policy to use | |
| CLT_ACTION_LIFECYCLE_CLT | Request an operation on a CLT lifecycle<br>Parameters:<br>oam_id as the ID of the object<br>operation as the operation to perform<br>policyId as the ID of the policy to use | |
| CLT_ACTION_PERMISSIONS_SHOW | Request display of the permissions dialog<br>Parameters:<br>oam_id as the ID of the object | |
| CLT_ACTION_ADVANCED_SEARCH | Request display of the advanced search dialog | |
| CLT_ACTION_ADVANCED_SEARCH_CATEGPRY_DIALOG | | |
| CLT_ACTION_PREFERENCES_SHOW | Request display of the user preferences dialog | |
| CLT_ACTION_QUERYFORM_SHOW | Request display of the query form dialog<br>Parameters:<br>oam_id as the ID of the query form | |
| CLT_ACTION_QUERY_CATEGORY_DIALOG | | |
| CLT_ACTION_RENDITION_ADD | Request display of the add | |

| Action Channels NAME | Channel Details | Notes |
|---|---|---|
| | rendition dialog Parameters: oam_id as the ID of the document to add rendition to | |
| CLT_ACTION_RENDITION_REQUEST | Request rendition for a document Parameters: oam_id as the ID of the document | |
| CLT_ACTION_SYNCPLICITY | Request display of the syncplicity dialog for a document Parameters: oam_id as the ID of the document | |
| CLT_ACTION_CONVERT_VD | | Vdoc widget |
| CLT_ACTION_CONVERT_SIMPLE | | |
| CLT_ACTION_SNAPSHOT_CREATE | | Snapshot widget |
| CLT_ACTION_VD_ADD_CHILD_SELECTED | Request display of the add child dialog for the current selected item in the VD widget | |
| CLT_ACTION_VD_REMOVE_CHILD_SELECTED | Request display of the remove child dialog for the current selected item in the VD widget | |
| CLT_ACTION_VD_SET_CHILD_BINDING_VERSION | Request setting of binding version of the current selected item in the VD widget | |
| CLT_ACTION_VD_INSERT_INHERITED_COMPONENT | Request display of the inserted inherited component dialog for the current selected item in the VD widget | |
| CLT_ACTION_VD_CLEAR_VD | | |
| CLT_ACTION_WORKFLOW_LAUNCH | Launch a workflow for a document. Parameters: oam_id as the ID of the document config as the workflow configuration name to use | |
| CLT_ACTION_WORKFLOW_LAUNCH_SCHEDULED | Launch a scheduled workflow for a document. Parameters: oam_id as the queue item | |
| CLT_ACTION_WORKFLOW_UPDATE_PERFORMERS | Request display of the update performers dialog Parameters: oam_id as the queue_item | |
| CLT_ACTION_WORKFLOW_ABORT | Request display of the abort | |

| Action Channels NAME | Channel Details | Notes |
|---|---|---|
| | workflow dialog<br>Parameters:<br>oam_id as the<br>tracker | |
| CLT_ACTION_TASK_ACQUIRE | Set the task as<br>acquired<br>Parameters:<br>oam_id as<br>the ID of the task<br>forceAcquire<br>to force<br>acquisition if<br>"true"<br>forceRead to<br>force read if<br>"true" | |
| CLT_ACTION_TASK_READ | Set the task as<br>read/unread<br>Parameters:<br>oam_id as<br>the ID of the task<br>read if "true",<br>unread otherwise | |
| CLT_ACTION_TASK_PRIORITY | Set the task<br>priority<br>Parameters:<br>oam_id as<br>the ID of the task<br>priority (integer<br>as string) | |
| CLT_ACTION_TASK_FORWARD | Request display<br>of the task<br>forward dialog<br>Parameters:<br>oam_id as the ID<br>of the task | |
| CLT_ACTION_TASK_REJECT | Request display<br>of the task reject<br>dialog<br>Parameters:<br>oam_id as the ID<br>of the task | |
| CLT_ACTION_TASK_DELEGATE | Request display<br>of the task<br>delegate dialog<br>Parameters:<br>oam_id as<br>the ID of the task<br>source: "tracker"<br>or "task" | |
| CLT_ACTION_TASK_NOTE | Request display<br>of the task note<br>dialog<br>Parameters:<br>oam_id as the ID<br>of the task | Task<br>notes<br>widget |
| CLT_ACTION_TASK_PROCESS | Request display<br>of the task<br>process dialog<br>Parameters:<br>oam_id as<br>the ID of the task<br>operation to<br>perform | |
| CLT_ACTION_TAXONOMY_EXPORT | Request display<br>of the export<br>taxonomy dialog<br>Parameters:<br>oam_id as the ID<br>of the taxonomy | |
| CLT_ACTION_TAXONOMY_IMPORT | Request display<br>of the import<br>taxonomy dialog<br>Parameters:<br>oam_id as the ID<br>of the taxonomy | |

-continued

| Action Channels NAME | Channel Details | Notes |
|---|---|---|
| CLT_ACTION_TAXONOMY_CHECKIN | Request display of the checkin taxonomy dialog Parameters: oam_id as the ID of the taxonomy | |
| CLT_ACTION_TAXONOMY_SAVE | Request display of the save taxonomy dialog Parameters: oam_id as the ID of the taxonomy | |
| CLT_ACTION_TAXONOMY_PROPERTIES | Request display of the taxonomy properties dialog Parameters: oam_id as the ID of the taxonomy | |
| CLT_ACTION_TAXONOMY_LOCATE | Request locate of the taxonomy Parameters: oam_id as the ID of the taxonomy | Locations widget |
| CLT_ACTION_TAXONOMY_RESTORE | Request display of the restore taxonomy dialog Parameters: oam_id as the ID of the taxonomy | |
| CLT_ACTION_DICTIONARY_EXPORT | Request display of the export dictionary dialog Parameters: oam_id as the ID of the dictionary | |
| CLT_ACTION_DICTIONARY_IMPORT | Request display of the import dictionary dialog Parameters: oam_id as the ID of the dictionary | |
| CLT_ACTION_DICTIONARY_SAVE | Request display of the save dictionary dialog Parameters: oam_id as the ID of the dictionary | |
| CLT_ACTION_DICTIONARY_RESTORE | Request display of the restore dictionary dialog Parameters: oam_id as the ID of the dictionary | |
| CLT_ACTION_DICTIONARY_UPDATE | Request display of the update dictionary dialog Parameters: oam_id as the ID of the dictionary | |
| CLT_ACTION_DICTIONARY_PROPERTIES | Request display of the dictionary properties dialog Parameters: oam_id as the ID of the dictionary | |
| CLT_ACTION_GROUP_CREATE | | Groups widget |
| CLT_ACTION_GROUP_PROPERTIES | | Properties widget |
| CLT_ACTION_USER_CREATE | | Users widget |
| CLT_ACTION_USER_PROPERTIES | | Properties widget |
| CLT_ACTION_RELATION_CREATE | Request display of the relation creation dialog Parameters: | Relations widget |

| Action Channels NAME | Channel Details | Notes |
| --- | --- | --- |
| CLT_ACTION_RELATION_DESTROY | oam_id as the ID of the document to create a relation with Request display of the relation destroy dialog Parameters: oam_id as the ID of the document to destroy a relation with associate_id is the ID of the relation to destroy | |
| CLT_ACTION_MASS_UPDATE | Launch a mass update for a document. Parameters: oam_id as the ID of the document config_name as the mass update configuration name to use | |
| CLT_ACTION_CUT | | |
| CLT_ACTION_COPY | | |
| CLT_ACTION_PASTE | | |
| CLT_ACTION_PASTE_LINK | | |
| CLT_ACTION_CLIPBOARD_GET | | |
| CLT_ACTION_CLIPBOARD_CONTENT | | |
| CLT_ACTION_EXPORT_FROM_URL | | |
| CLT_ACTION_SENDMAIL | | |

Figure 15:
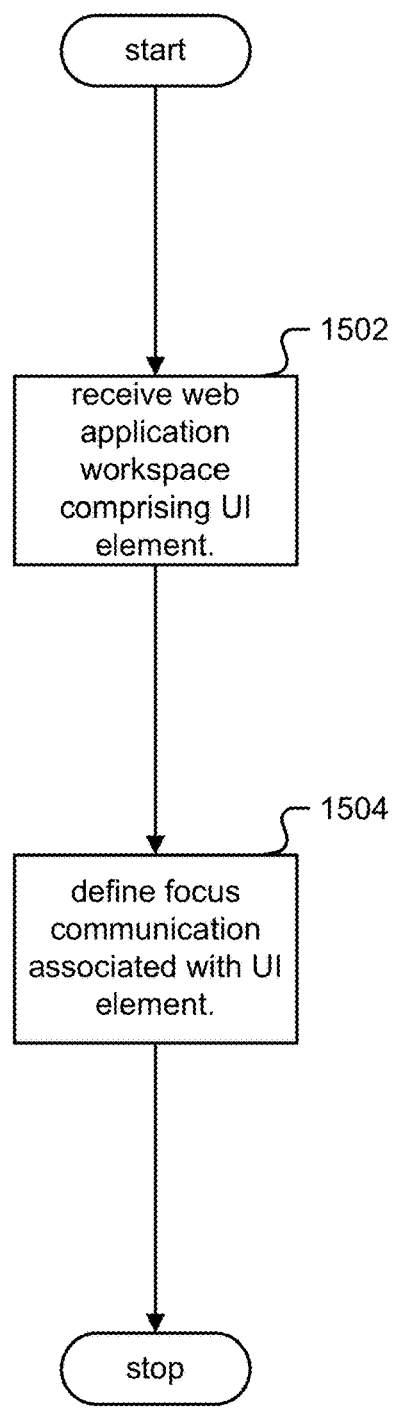
FIG. 15 is a flow chart illustrating an embodiment of a process for allowing switching of a user interface layout based on context and/or configuration.

FIG. 15 is a flow chart illustrating an embodiment of a process for allowing switching of a user interface layout based on context and/or configuration. The process in FIG. 15 may occur in the system of FIG. 1. At step 1502, a web application workspace is received comprising a UI element. In one embodiment, a UI layout is received. At step 1504, a focus communication is defined associated with the UI element, wherein when the focus communication is asserted at run time the UI element is made visibly more focused.

In one embodiment, the web application workspace is described in XML. In one embodiment, the web application workspace includes one or more of the following: a browser widget, a list widget, a thumbnail widget, a preview widget, a tasks browser widget, a virtual document widget, and a display for content managed folders and content managed files. In one embodiment, the UI element is a widget, including one or more of the following: repository navigation widgets, search widgets, content properties widgets, workflow widgets, and administration widgets. In one embodiment, the widget is a hidden widget for a specific workspace view.

In one embodiment, the UI element is a workspace view, in some cases associated with a layout file. In one embodiment, the focus communication is a focus event, in some cases associated with a widget, in some cases associated with a workspace view. In one embodiment, the focus communication is a focus action. In one embodiment, the focus communication is a publish-subscribe message pattern. In one embodiment, the focus communication is based at least in part on a workspace configuration at design-time, including focus communication parameters to allow filters for metadata included in the focus communication.

In one embodiment, an additional step (not shown in FIG. 15) reconciles a plurality of focus communications associated with a plurality of UI elements at run-time so that one of the plurality of UI elements is made visibly more focused. In one embodiment, the UI elements in the plurality of UI elements includes a workspace view and/or a widget. In one embodiment, reconciling is determined at least in part by using a prioritized set of rules.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:

receiving a web application multiview workspace of a content management system client web application that comprises a plurality of widgets, the web application multiview workspace comprising a plurality of UI elements to access information related to content managed by a content management system; and using a processor, at design time, to define via a graphical user interface a configuration for the web application multiview workspace, the configuration comprising a definition of a plurality of views for the web application multiview workspace, each of the plurality of views represented by a separate layout file that specifies a corresponding visual layout and widgets from the plurality of widgets that are in the corresponding visual layout, a defined focus communication associated with at least one widget of the plurality of widgets, and a defined focus communication associated with at least one view of the plurality of views;

wherein, the content management system client web application is configured to:
 display the web application multiview workspace in a window according to a first view;
 detect, at run time, an assertion of a run time asserted focus communication;
 respond to the run time assertion by sequentially applying conflict resolution rules comprising a prioritized set of a plurality of conflict resolution rules to select a view of the plurality of views of the web application multiview workspace to display in the same window and select a widget in the selected view to gain focus in the window, wherein each of the conflict resolution rules of the prioritized set of the plurality of conflict resolution rules includes a respective prioritized test, wherein the content management system client web application is configured to evaluate the respective prioritized tests in order by priority, until a passing result is determined in the ordered evaluation, wherein evaluating the respective prioritized tests in order by priority includes matching the run time asserted focus communication to the defined focus communication associated in the configuration with the at least one view or the defined focus communication associated in the configuration with the at least one widget;

wherein the prioritized set of the plurality of conflict resolution rules comprises:
 a rule to select a second view as the selected view and set a widget focus to a widget in the second view when the run time asserted focus communication and a set of associated additional event parameters matches a focus communication and additional event parameters specified in the configuration for the second view and a focus communication and additional event parameters specified in the configuration for the widget in the second view;
 a rule to set the widget focus to a widget in the first view when the run time asserted focus communication matches a focus communication specified in the configuration for the widget in the first view;
 a rule to select the second view and set the widget focus to the widget in the second view when the run time asserted focus communication matches the focus communication specified in the configuration for the widget in the second view; and
 a rule to select the second view when the run time asserted focus communication matches the focus communication specified in the configuration for the second view.

2. The method of claim 1, wherein each of the plurality of views is represented in a separate eXtensible Markup Language ("XML") file.

3. The method of claim 1, wherein the web application multiview workspace includes one or more of the following:
 a browser widget, a list widget, a thumbnail widget, a preview widget, a tasks browser widget, a virtual document widget, and a display for content managed folders and content managed files.

4. The method of claim 1, wherein the widget in the first view includes one or more of the following:
 a repository navigation widget, a search widget, a content properties widget, a workflow widget, or an administration widget.

5. The method of claim 1, wherein the at least one widget comprises a hidden widget for a specific workspace view.

6. The method of claim 1, wherein the defined focus communication associated with the at least one view is a focus action.

7. The method of claim 1, wherein the defined focus communication associated with the at least one view is a publish-subscribe message pattern.

8. The method of claim 1, wherein the configuration includes focus communication parameters associated with filters for metadata included in the defined focus communication associated with the at least one view.

9. A system, comprising:
 a processor configured to:
 receive a web application multiview workspace of a content management system client web application for display in a window according to a first view of a plurality of views associated with the web application multiview workspace, the web application multiview workspace comprising a plurality of UI elements to access information related to content managed by a content management system; and
 receive a configuration for the web application multiview workspace, the configuration comprising a definition of the plurality of views for the web application multiview workspace, each of the plurality of views represented by a separate layout file that specifies a corresponding visual layout and widgets from a plurality of widgets that are in the corresponding visual layout, a defined focus communication associated with at least one widget of the plurality of widgets, and a defined focus communication associated with at least one view of the plurality of views, the content management system client web application configured to cause the processor to:
 detect, at run time, a run time asserted focus communication;
 respond to the run time assertion in accordance with conflict resolution rules comprising a prioritized set of a plurality of conflict resolution rules configured for sequential application to select a view of the plurality of views of the web application multiview workspace to display in the same window and select a widget in the selected view to gain focus in the window, wherein each of conflict resolution rules of the prioritized set of the conflict resolution rules includes a respective prioritized test, wherein the respective prioritized tests are configured for evaluation in order by priority, until a passing result is determined in the ordered evaluation, wherein evaluating the respective prioritized tests in order by priority includes matching the run time asserted focus communication to a focus communication associated in the configuration to the defined focus communication associated in the configuration with the at least one view or the defined focus communication associated in the configuration with the at least one widget; and
 a memory coupled to the processor and configured to provide the processor with instructions,
 wherein the prioritized set of the plurality of conflict resolution rules comprises:
 a rule to select a second view as the selected view and set a widget focus to a widget in the second view when the run time asserted focus communication and a set of associated additional event parameters matches a focus communication and additional event parameters specified in the configuration for the second view and a focus communication and additional event parameters specified in the configuration for the widget in the second view;

a rule to set the widget focus to a widget in the first view when the run time asserted focus communication matches a focus communication specified in the configuration for the widget in the first view;

a rule to select the second view and set the widget focus to the widget in the second view when the run time asserted focus communication matches the focus communication specified in the configuration for the widget in the second view; and a rule to select the second view when the run time asserted focus communication matches the focus communication specified in the configuration for the second view.

10. The system of claim 9, wherein each of the plurality of views is represented in a separate eXtensible Markup Language ("XML") file.

11. The system of claim 9, wherein the web application multiview workspace includes one or more of the following:

a browser widget, a list widget, a thumbnail widget, a preview widget, a tasks browser widget, a virtual document widget, and a display for content managed folders and content managed files.

12. The system of claim 9, wherein the widget in the first view includes one or more of the following:

a repository navigation widget, a search widget, a content properties widget, a workflow widget, or an administration widget.

13. The system of claim 9, wherein the at least one widget comprises a hidden widget for a specific workspace view.

14. The system of claim 9, wherein the defined focus communication associated with the at least one view is a focus action.

15. The system of claim 9, wherein the defined focus communication associated with the at least one view is a publish-subscribe message pattern.

16. The system of claim 9, wherein the configuration includes focus communication parameters associated with filters for metadata included in the defined focus communication associated with the at least one view.

17. A computer program product, the computer program product being embodied in a tangible, non-transitory computer readable storage medium and comprising computer instructions for:

receiving a web application multiview workspace of a content management system client web application for display in a window according to a first view of a plurality of views associated with the web application multiview workspace, the web application multiview workspace comprising a plurality of UI elements to access information related to content managed by a content management system; and receiving a configuration for the web application multiview workspace, the configuration comprising a definition of the plurality of views for the web application multiview workspace, each of the plurality of views represented by a separate layout file that specifies a corresponding visual layout and widgets from a plurality of widgets that are in the corresponding visual layout, a defined focus communication associated with at least one widget of the plurality of widgets, and a defined focus communication associated with at least one view of the plurality of views;

responding to a run time asserted focus communication in accordance with conflict resolution rules comprising a prioritized set of a plurality of conflict resolution rules configured for sequential application to select a view of the plurality of views of the web application multiview workspace to display in the same window and select a widget in the selected view to gain focus in the window, wherein each of the conflict resolution rules of the prioritized set of the plurality of conflict resolution rules includes a respective prioritized test, wherein the respective prioritized tests are configured for evaluation in order by priority, until a passing result is determined in the ordered evaluation, wherein evaluating the respective prioritized tests in order by priority includes matching the run time asserted focus communication with a focus communication associated in the configuration to the defined focus communication associated in the configuration with the at least one view or the defined focus communication associated in the configuration with the at least one widget wherein the prioritized set of the plurality of conflict resolution rules comprises:

a rule to select a second view as the selected view and set a widget focus to a widget in the second view when the run time asserted focus communication and a set of associated additional event parameters matches a focus communication and additional event parameters specified in the configuration for the second view and a focus communication and additional event parameters specified in the configuration for the widget in the second view;

a rule to set the widget focus to a widget in the first view when the run time asserted focus communication matches a focus communication specified in the configuration for the widget in the first view; and a rule to select the second view and set the widget focus to the widget in the second view when the run time asserted focus communication matches the focus communication specified in the configuration for the widget in the second view;

a rule to select the second view when the run time asserted focus communication matches the focus communication specified in the configuration for the second view.

18. The computer program product of claim 17, wherein each of the plurality of views is represented in a separate eXtensible Markup Language ("XML") file.

19. The computer program product of claim 17, wherein the web application multiview workspace includes one or more of the following:

a browser widget, a list widget, a thumbnail widget, a preview widget, a tasks browser widget, a virtual document widget, and a display for content managed folders and content managed files.

20. The computer program product of claim 17, wherein the widget in the first view includes one or more of the following:

a repository navigation widget, a search widget, a content properties widget, a workflow widget, or an administration widget.

21. The computer program product of claim 17, wherein the at least one widget comprises a hidden widget for a specific workspace view.

22. The computer program product of claim 17, wherein the defined focus communication associated with the at least one view is a focus action.

23. The computer program product of claim 17, wherein the defined focus communication associated with the at least one view is a publish-subscribe message pattern.

24. The computer program product of claim 17, wherein the configuration includes focus communication parameters associated with filters for metadata included in the defined focus communication associated with the at least one view.

* * * * *